United States Patent
Koga

(10) Patent No.: US 11,598,999 B2
(45) Date of Patent: Mar. 7, 2023

(54) ELECTRO-OPTICAL DEVICE AND ELECTRONIC APPARATUS

(71) Applicant: SEIKO EPSON CORPORATION, Tokyo (JP)

(72) Inventor: Yuki Koga, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/849,687

(22) Filed: Jun. 26, 2022

(65) Prior Publication Data
US 2022/0413328 A1     Dec. 29, 2022

(30) Foreign Application Priority Data
Jun. 28, 2021     (JP) .............................. JP2021-106442

(51) Int. Cl.
G09G 3/30     (2006.01)
G02F 1/1368     (2006.01)
G02F 1/1362     (2006.01)

(52) U.S. Cl.
CPC ...... *G02F 1/1368* (2013.01); *G02F 1/136209* (2013.01)

(58) Field of Classification Search
CPC ... G02F 1/1368; G02F 1/136209; G09G 3/18; G09G 3/2003; G09G 3/3406–3426; G09G 3/36–3696; G09G 2300/0439–0895; G09G 2310/00–0297
See application file for complete search history.

(56) References Cited

U.S. PATENT DOCUMENTS

| | | | |
|---|---|---|---|
| 6,433,841 B1 * | 8/2002 | Murade | G02F 1/136209 349/110 |
| 2002/0060756 A1 * | 5/2002 | Kurashina | G02F 1/136213 349/39 |
| 2010/0012979 A1 * | 1/2010 | Ishii | G02F 1/136209 257/E27.111 |
| 2020/0117063 A1 | 4/2020 | Sugimoto | |
| 2020/0292892 A1 | 9/2020 | Ito | |

FOREIGN PATENT DOCUMENTS

| | | |
|---|---|---|
| JP | 2017120434 | 7/2017 |
| JP | 2018146870 | 9/2018 |
| JP | 2020064130 | 4/2020 |
| JP | 2021009395 | 1/2021 |

\* cited by examiner

*Primary Examiner* — Sanghyuk Park
(74) *Attorney, Agent, or Firm* — JCIPRNET

(57) ABSTRACT

A liquid crystal device that is an electro-optical device includes: a transistor including a semiconductor layer extending along a Y axis extending direction that is a first direction, a light shielding region that is a light shielding layer including a first extending portion extending along the first direction, and a wide portion overlapping a channel region of the semiconductor layer and provided wider than the first extending portion, an interlayer insulation layer provided with an opening in a region overlapping the light shielding region, and a capacitance element including a first capacitance electrode provided in the opening of the interlayer insulation layer and including a protruding portion protruding over the interlayer insulation layer, and a second capacitance electrode provided to cover the protruding portion of the first capacitance electrode.

12 Claims, 22 Drawing Sheets

ELECTRO-OPTICAL DEVICE AND ELECTRONIC APPARATUS

The present application is based on, and claims priority from JP Application Serial Number 2021-106442, filed Jun. 28, 2021, the disclosure of which is hereby incorporated by reference herein in its entirety.

BACKGROUND

1. Technical Field

The present disclosure relates to an electro-optical device and an electronic apparatus including the electro-optical device.

2. Related Art

JP-A-2017-120434 discloses a known liquid crystal device including a trench-type capacitance element as a capacitance element that holds a pixel potential.

The trench-type capacitance element described in JP-A-2017-120434 includes a groove-shaped recessed portion formed in an interlayer insulation film, as well as a capacitance insulation film and a capacitance electrode stacked in the groove-shaped recessed portion.

Unfortunately, with the trench-type capacitance element described in JP-A-2017-120434, there is a problem in that since the structure with the capacitance insulation film and the capacitance electrode are formed in the groove-shaped recessed portion, this structure is likely to result in poor coverage.

This problem becomes more serious when the groove width of the groove-shaped recessed portion is reduced for miniaturization of the capacitance element, or when the groove depth of the groove-shaped recessed portion is increased for increasing the electrostatic capacity of the capacitance element, and thus further leads to a problem in that the capacitance element is difficult to miniaturize or have an increased capacity.

SUMMARY

An electro-optical device includes: a transistor including a semiconductor layer extending along a first direction, a light shielding layer including a first extending portion extending along the first direction, and a wide portion overlapping a channel region of the semiconductor layer and provided wider than the first extending portion, an interlayer insulation layer provided with an opening in a region overlapping the light shielding layer, and a capacitance element including a first capacitance electrode provided in the opening of the interlayer insulation layer and including a protruding portion protruding over the interlayer insulation layer, and a second capacitance electrode provided to cover the protruding portion of the first capacitance electrode.

An electro-optical device includes: a transistor including a semiconductor layer extending along a first direction, a light shielding layer including a first extending portion extending along the first direction, and a wide portion overlapping a channel region of the semiconductor layer and provided wider than the first extending portion, an interlayer insulation layer provided with an opening in a region overlapping the light shielding layer, and a capacitance element including a conductive member provided in the opening of the interlayer insulation layer and including a protruding portion protruding over the interlayer insulation layer, a first capacitance electrode provided to cover the protruding portion of the conductive member, and a second capacitance electrode provided to overlap the first capacitance electrode.

An electronic apparatus includes the above-described electro-optical device.

A method of manufacturing an electro-optical device includes: forming a transistor, forming a light shielding layer including a first extending portion extending along a first direction, and a wide portion including a region overlapping a channel region of the transistor provided wider than the first extending portion, forming an interlayer insulation layer, a stopper layer, and a sacrificial layer in this order on the light shielding layer, forming an opening in the sacrificial layer, the stopper layer, and the interlayer insulation layer to reach the light shielding layer, forming a spacer at an inner wall of the opening, forming a first capacitance electrode that is in contact with the wide portion in the opening including the spacer, exposing part of the first capacitance electrode by removing the sacrificial layer and the spacer at the stopper layer, and forming a capacitance element including the first capacitance electrode, a capacitance insulation layer, and a second capacitance electrode by forming the capacitance insulation layer and the second capacitance electrode to cover the exposed first capacitance electrode.

A method of manufacturing an electro-optical device includes: forming a transistor, forming a light shielding layer including a first extending portion extending along a first direction, and a wide portion including a region overlapping a channel region of the transistor provided wider than the first extending portion, forming an interlayer insulation layer, a stopper layer, and a sacrificial layer in this order on the light shielding layer, forming a hard mask provided with an opening at a position in the sacrificial layer corresponding to the light shielding layer, forming a spacer at an inner wall of the opening in the hard mask, forming an opening in the sacrificial layer, the stopper layer, and the interlayer insulation layer to reach the light shielding layer using the hard mask, forming a first capacitance electrode that is in contact with the light shielding layer in the opening, exposing part of the first capacitance electrode by removing the sacrificial layer at the stopper layer, and forming a capacitance element including the first capacitance electrode, a capacitance insulation layer, and a second capacitance electrode by forming the capacitance insulation layer and the second capacitance electrode to cover the exposed first capacitance electrode.

DESCRIPTION OF EXEMPLARY EMBODIMENTS

Figure 1:
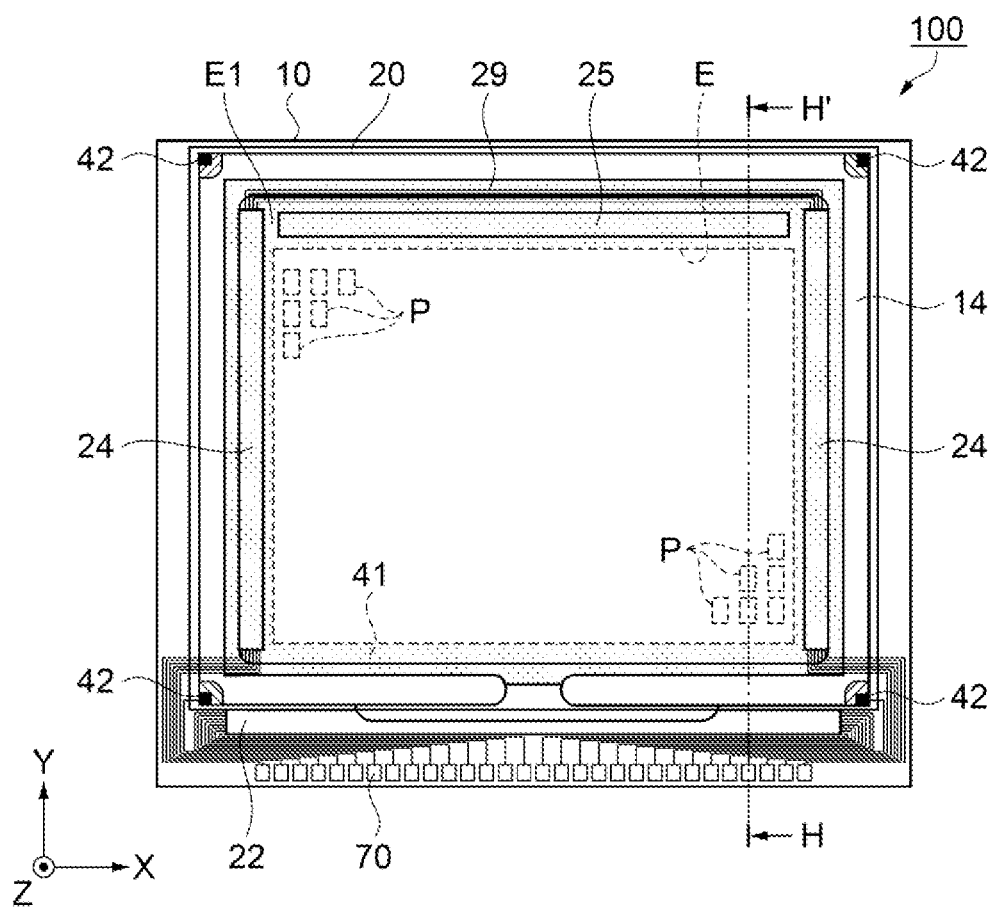
FIG. 1 is a plan view illustrating a schematic configuration of an electro-optical device according to a first embodiment.

Embodiments of the present disclosure will be described below with reference to the accompanying drawings.

Note that, in each of the drawings below, to make each member a recognizable size, each of the members are illustrated to be different from an actual scale. In the drawings described below, XYZ axes are added as coordinate axes orthogonal to each other as appropriate, with a direction pointed by an arrow along each axis defined as a + direction, and with a direction opposite to the + direction defined as a − direction. In the present embodiment, a "first direction" corresponds to a +Y direction or a −Y direction that is a direction in which the Y axis extends, and a "second direction" corresponds to a +X direction or a −X direction that is a direction in which the X axis extends, unless stated otherwise. Note that, a +Z direction may be also referred to as an upper side, and a −Z direction may be also referred to as a lower side. Furthermore, as viewed in the +Z direction is referred to as in plan view or plane view. Further, in the following description regarding a substrate, for example, the term "at the substrate" refers to any of a case where something is disposed in contact with the substrate, a case where something is disposed at the substrate with another structure provided in between, and a case where something is disposed at the substrate with a part being in contact with the substrate and another part being disposed with another structure provided in between.

1. First Embodiment

FIG. 1 is a plan view of a liquid crystal device viewed from a counter substrate side.

In the present embodiment, an active drive type liquid crystal device 100 including a Thin Film Transistor (TFT) as a transistor for each pixel will be described as an example of an electro-optical device. The liquid crystal device 100 can be used favorably as a light modulation device for a projection-type display apparatus 1000 that is an electronic apparatus described below, for example.

1.1 Summary of Electro-Optical Device

As illustrated in FIG. 1, the liquid crystal device 100 includes an element substrate 10 and a counter substrate 20. Any configuration illustrated with a solid line on the inner side of the outer shape line of the counter substrate 20 is a configuration disposed between the counter substrate 20 and the element substrate 10.

A seal material 14 is disposed along the outer edge of the counter substrate 20. A partition portion 41 formed from a light shielding layer is disposed, on the inner side of the seal material 14, along the outer edge of a display region E, to surround the display region E. In the display region E, pixels P are arranged in a matrix form. In a peripheral region E1 between the display region E and the seal material 14, a scanning line drive circuit 24, an inspection circuit 25 for inspecting a pixel circuit constituting the pixels P, and wiring 29 are disposed. In a portion of the element substrate 10 protruding downward in the figure from the counter substrate 20 on the outer side of the seal material 14, a data line drive circuit 22 and a plurality of external coupling terminals 70 are disposed.

At each corner of the counter substrate 20, an inter-substrate conduction material 42 is disposed for establishing electrical conduction between the element substrate 10 and the counter substrate 20.

1.2. Cross-Sectional Configuration of Liquid Crystal Device

Figure 2:
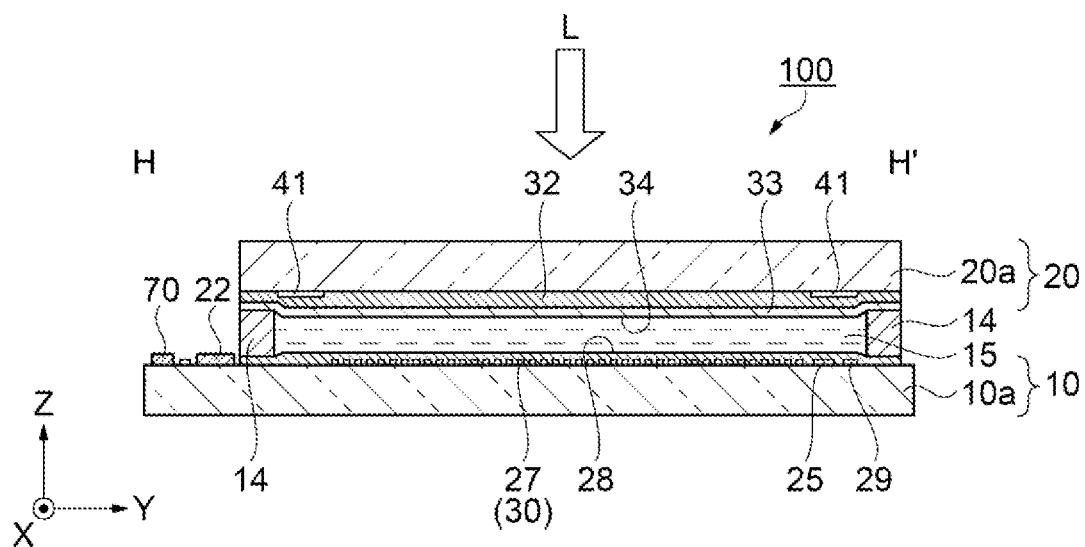
FIG. 2 is a cross-sectional view taken along line H-H' in FIG. 1.

FIG. 2 is a cross-sectional view illustrating a schematic configuration of the liquid crystal device taken along line H-H' in FIG. 1.

As illustrated in FIG. 2, the element substrate 10 and the counter substrate 20 are disposed with the seal material 14 interposed in between, and a liquid crystal layer 15 is disposed between the substrates.

The element substrate 10 includes, between its substrate 10a and the liquid crystal layer 15, pixel electrodes 27 that have optical transparency and are provided for the respective pixels P, transistors 30 disposed corresponding to the pixel electrodes 27, and a first alignment layer 28 disposed to cover the pixel electrodes 27.

The counter substrate 20 includes, between its substrate 20a and the liquid crystal layer 15, the partition portion 41, an insulation layer 32 disposed to cover the partition portion, a counter electrode 33 provided to cover the insulation layer 32, and a second alignment layer 34 disposed to cover the counter electrode 33.

The light shielding layer 41 is provided at a position overlapping the scanning line drive circuit 24 and the inspection circuit 25 in plan view. The light shielding layer 41 blocks light L from a laser light source (not illustrated) incident from the counter substrate 20 side, to prevent the light L from being incident on peripheral circuits including the scanning line drive circuit 24, and thus functions to prevent the peripheral circuits from malfunctioning due to the light L. In addition, the light shielding layer 41 blocks light to prevent unnecessary stray light from being incident on the display region E, and ensures high contrast in display on the display region E.

The pixel electrodes 27 and the counter electrode 33 are formed by, for example, a transparent conductive material such as Indium Tin Oxide (ITO). The substrate 10a and the substrate 20a are each a transmissive substrate. For example, a glass substrate or a quartz substrate is used as such a substrate. The first alignment layer 28 and the second alignment layer 34 are made of an inorganic material such as silicon oxide. The insulation layer 32 is made of an inorganic material with optical transparency, such as silicon oxide, for example. The liquid crystal layer 15 includes, for example, a liquid crystal having negative dielectric anisotropy. Surface treatment using a silane coupling agent is performed on surfaces of the first alignment layer 28 and the second alignment layer 34.

1.3. Summary of Pixel Circuit

Figure 3:
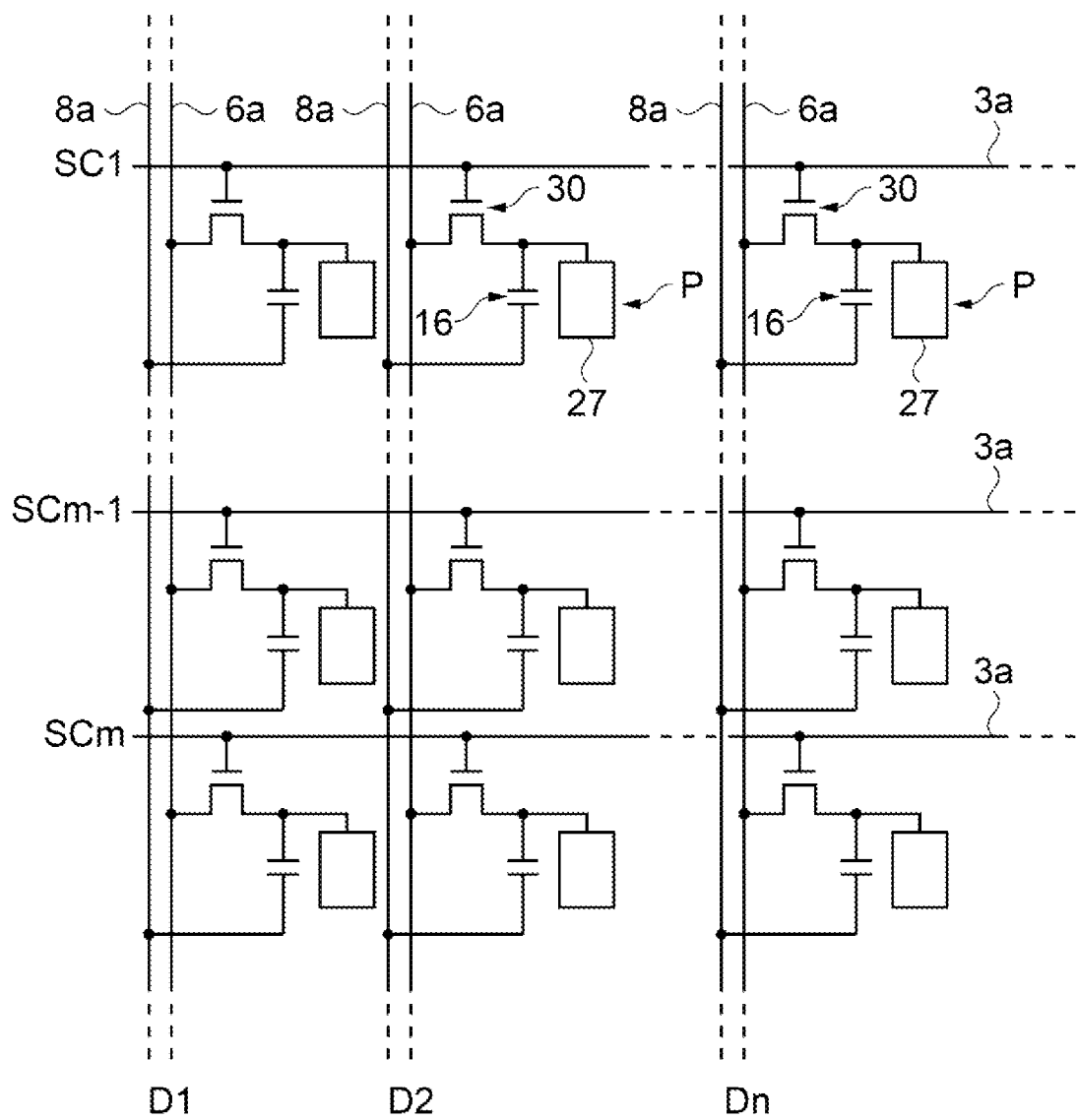
FIG. 3 is an equivalent circuit diagram illustrating an electrical configuration of the electro-optical device in FIG. 1.
Figure 3:
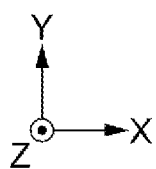

FIG. 3 is an equivalent circuit diagram illustrating an electrical configuration of a display region.

In the display region E, scanning lines 3a and data lines 6a are arranged in a grid form. Capacitance lines 8a are disposed to overlap the data lines 6a. Note that the capacitance lines 8a may be disposed to overlap the scanning lines 3a, or may be disposed along both the data lines 6a and the scanning lines 3a. The pixels P are disposed at intersections between the scanning lines 3a and the data lines 6a. The pixels P each include the pixel electrode 27, the transistor 30, and a capacitance element 16.

The capacitance element 16 functions as an auxiliary capacitance for the pixel electrode 27. The capacitance element 16 has one electrode electrically coupled to the pixel electrode 27 and has the other electrode electrically coupled to the capacitance line 8a. A gate electrode 30g of the transistor 30 is electrically coupled to the scanning line 3a. One side of a source/drain region of the transistor 30 is electrically coupled to the data line 6a. The other side of the source/drain region of the transistor 30 is electrically coupled to the pixel electrode 27.

Scan signals SC1, . . . , SCm-1, and SCm are supplied from the scanning line drive circuit 24 to the plurality of scanning lines 3a in a predetermined order. The plurality of pixels P electrically coupled to the same scanning line 3a are controlled to turn ON or OFF at once, with a same scan signal SCx.

Image signals D1, D2, . . . , and Dn are supplied from the data line drive circuit 22 to the plurality of data lines 6a in a predetermined order, and an image signal Dx is supplied to the pixel electrode 27 of the pixel P selected with the scan signal SCx. The image signal Dx is a voltage signal corresponding to the gradation indicated by the image signal.

The plurality of capacitance lines 8a are electrically coupled to a common potential line (not illustrated), to be supplied with a common potential supplied to the counter electrode 33. Note that the common potential is a constant potential. In a case of a polarity inversion drive electro-optical device, the constant potential may be a potential that is fixed in each of a positive polarity writing period and a negative polarity writing period, and thus may be different between the periods.

1.4. Summary of Pixel

Figure 4:
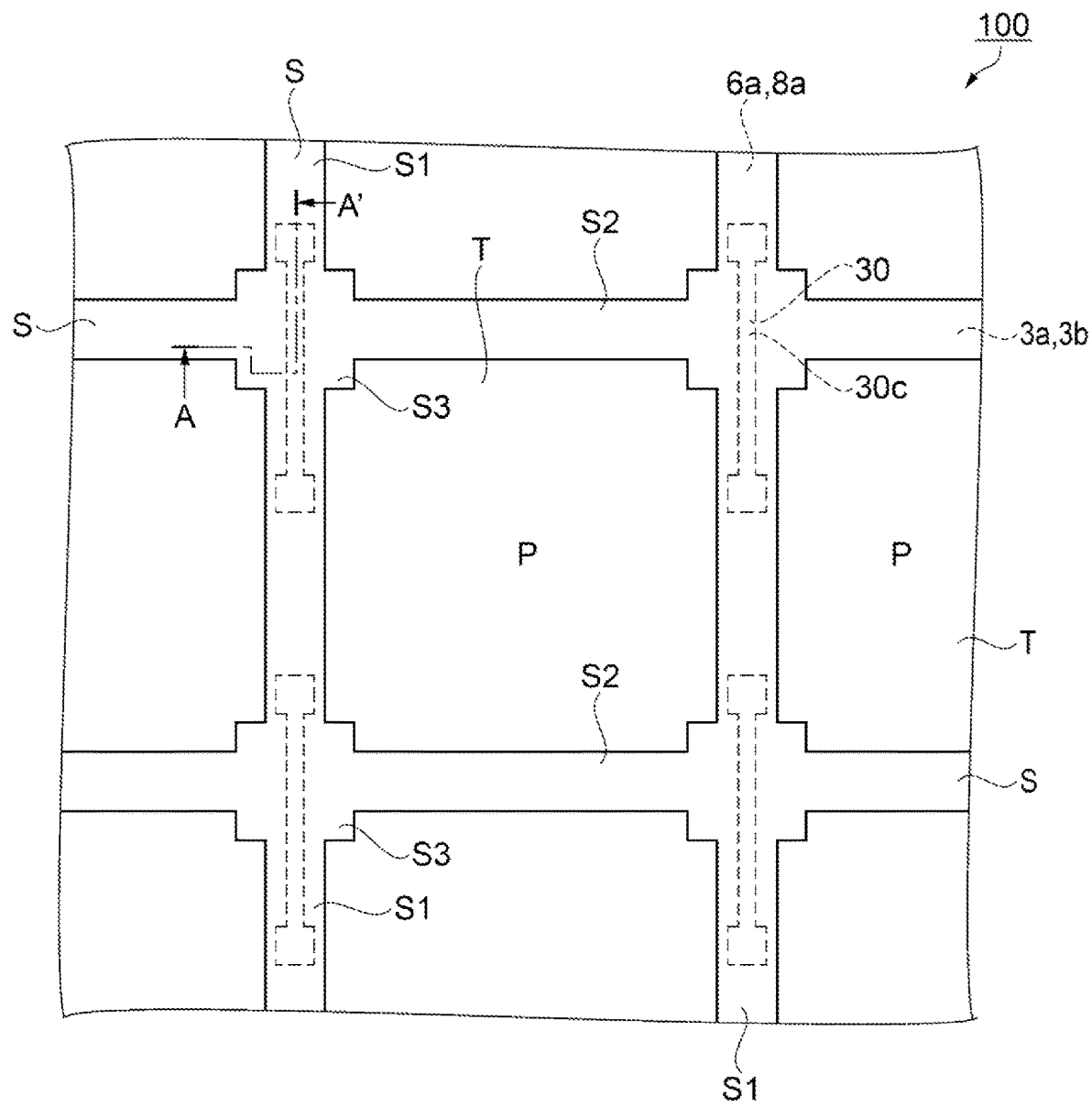
FIG. 4 is a plan view illustrating a configuration of a pixel.
Figure 5:
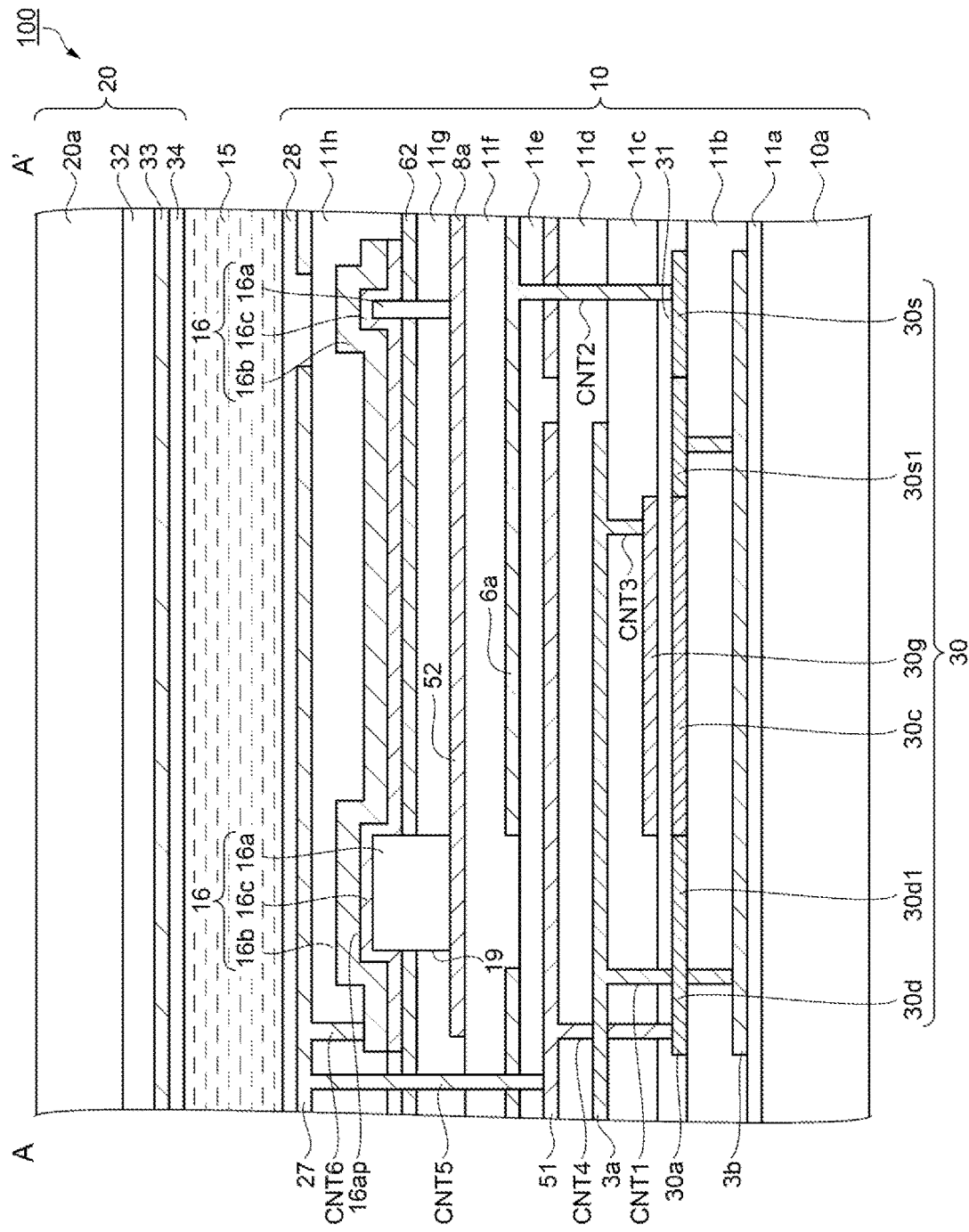
FIG. 5 is a cross-sectional view of the electro-optical device taken along line A-A' in FIG. 4.

FIG. 4 is a plan view illustrating a configuration of a pixel in a display region in plan view. FIG. 5 is a cross-sectional view taken along line A-A' in FIG. 4.

As illustrated in FIG. 4, a light shielding region S is provided between a transmissive region T of a pixel P and a transmissive region T of an adjacent pixel P.

The light shielding region S includes one or a plurality of light shielding layers including a light shielding material. In the present embodiment, the light shielding region S includes the scanning lines 3a and a lower-side light-shielding layer 3b extending along the X axis extending direction, as well as the data lines 6a and the capacitance lines 8a extending along the Y axis extending direction.

The transistor 30 is disposed in a portion where the scanning line 3a and the data line 6a intersect, and is arranged to extend along the extending direction of the capacitance lines 8a while overlapping the capacitance lines 8a.

The light shielding region S includes a first extending portion S1, a second extending portion S2, and a wide portion S3. The first extending portion S1 is a portion extending along the Y axis between the wide portions S3 adjacent to each other, and the second extending portion S2 is a portion extending along the X axis between the wide portions S3 adjacent to each other. The wide portion S3 is a portion provided wider than the first extending portion S1 and the second extending portion S2. The wide portion S3 overlaps a channel region 30c of the transistor 30 in plan view.

FIG. 5 schematically illustrates a layer structure in the light shielding region S, and coupling relationship between wiring layers and between each wiring layer and the transistor 30. As illustrated in FIG. 5, the element substrate 10 of the liquid crystal device 100 includes the lower-side light-shielding layer 3b that is an example of a light shielding layer, the transistor 30, the scanning line 3a, the data line 6a, the capacitance element 16, the pixel electrode 27, and the first alignment layer 28 between the substrate 10a and the liquid crystal layer 15, and further includes interlayer insulation layers 11a to 11h that are provided between the components and are made of silicon oxide or the like.

The interlayer insulation layer 11a is disposed at the substrate 10a, and the lower-side light-shielding layer 3b made of tungsten silicide (WSi) or the like is disposed at the interlayer insulation layer 11a.

The lower-side light-shielding layer 3b is electrically coupled to the scanning lines 3a via a contact hole CNT1. A tungsten plug may be provided in the contact hole CNT1 to serve as a relay electrode through which the lower-side light-shielding layer 3b and the scanning line 3a are electrically coupled. The interlayer insulation layer 11b is disposed at the lower-side light-shielding layer 3b, and the transistor 30 is disposed at the interlayer insulation layer 11b.

The transistor 30 is an N-type transistor having, for example, a Lightly Doped Drain (LDD) structure, and includes a semiconductor layer 30a made of polysilicon (high-purity polycrystalline silicon) or the like, a gate insulation layer 31 disposed at the semiconductor layer 30a, and the gate electrode 30g disposed at the gate insulation layer 31. The semiconductor layer 30a includes the channel region 30c, a first LDD region 30s1, a source region 30s, a second LDD region 30d1, and a drain region 30d. The interlayer insulation layer 11c is disposed at the gate electrode 30g.

The scanning lines 3a are disposed at the interlayer insulation layer 11c, and the interlayer insulation layer 11d is disposed at the scanning lines 3a. The scanning lines 3a are electrically coupled to the gate electrode 30g through a contact hole CNT3. A tungsten plug may be provided in the contact hole CNT3 to serve as a relay electrode through which the scanning lines 3a and the gate electrode 30g are electrically coupled.

A relay layer 51 is disposed at the interlayer insulation layer 11d, and the interlayer insulation layer 11e is disposed at the relay layer 51. The relay layer 51 is disposed between the pixel electrode 27 and the transistor 30, electrically coupled to the transistor 30 through a contact hole CNT4, and electrically coupled to the pixel electrode 27 through a contact hole CNT5. Thus, the pixel electrode 27 and the transistor 30 are electrically coupled to each other. A tungsten plug may be provided in the contact hole CNT4 to serve as a relay electrode through which the relay layer 51 and the transistor 30 are electrically coupled. A tungsten plug may be provided in the contact hole CNT5 to serve as a relay electrode through which the relay layer 51 and the pixel electrode 27 are electrically coupled.

The data line 6a is disposed at the interlayer insulation layer 11e and the interlayer insulation layer 11f is disposed at the data line 6a. The data line 6a is electrically coupled to the source region 30s of the transistor 30 through a contact hole CNT2. A tungsten plug may be provided in the contact hole CNT2 to serve as a relay electrode through which the data line 6a and the source region 30s of the transistor 30 are electrically coupled.

The capacitance line 8a is disposed at the interlayer insulation layer 11f, and the interlayer insulation layer 11g is disposed at the capacitance line 8a. A stopper layer 62 that is an etching stopper layer, is disposed at the interlayer insulation layer 11g. An opening 19 is formed in the interlayer insulation layer 11g and the stopper layer 62.

The opening 19 is formed through the interlayer insulation layer 11g and the stopper layer 62, and is formed to expose the capacitance line 8a. A first capacitance electrode 16a is disposed in the opening 19.

The first capacitance electrode 16a has a portion protruding over the interlayer insulation layer 11g and the stopper layer 62. The first capacitance electrode 16a is disposed in the opening 19 formed through the interlayer insulation layer 11g, and is physically and electrically coupled to the capacitance line 8a at the bottom of the opening 19.

A capacitance insulation layer 16c and a second capacitance electrode 16b are disposed to cover a protruding portion 16ap of the first capacitance electrode 16a protruding over the interlayer insulation layer 11g and the stopper layer 62.

The capacitance element 16 includes the first capacitance electrode 16a, the second capacitance electrode 16b, and the capacitance insulation layer 16c described above. An interlayer insulation layer 11h is disposed at the second capacitance electrode 16b. The second capacitance electrode 16b is electrically coupled to the pixel electrode 27 disposed at the interlayer insulation layer 11h, through a contact hole CNT6. A tungsten plug may be provided in the contact hole CNT6 to serve as a relay electrode through which the pixel electrode 27 and the second capacitance electrode 16b are electrically coupled.

1.5. Summary of Capacitance Element

Figure 6:
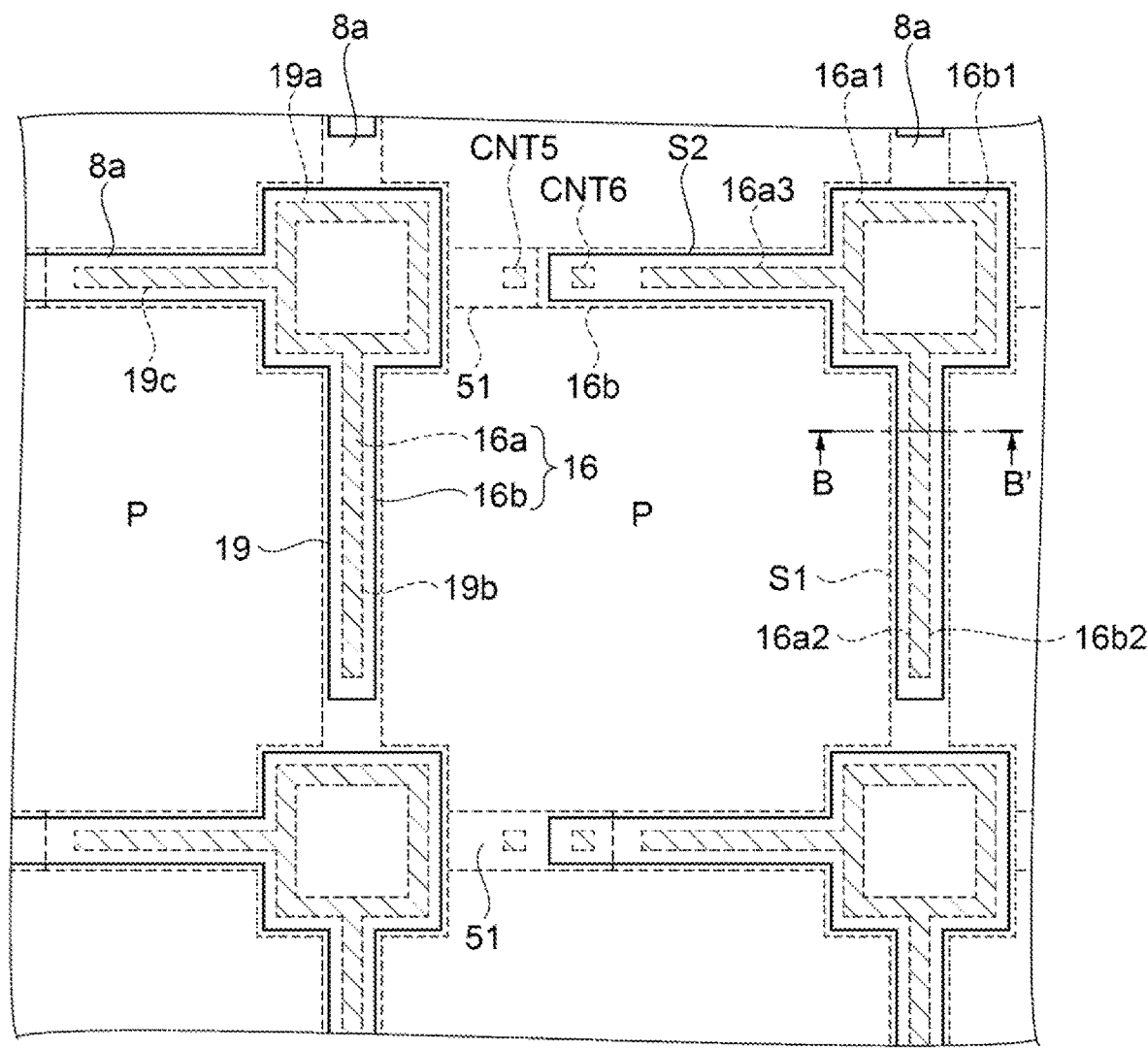
FIG. 6 is a plan view illustrating a configuration of a capacitance element.
Figure 7:
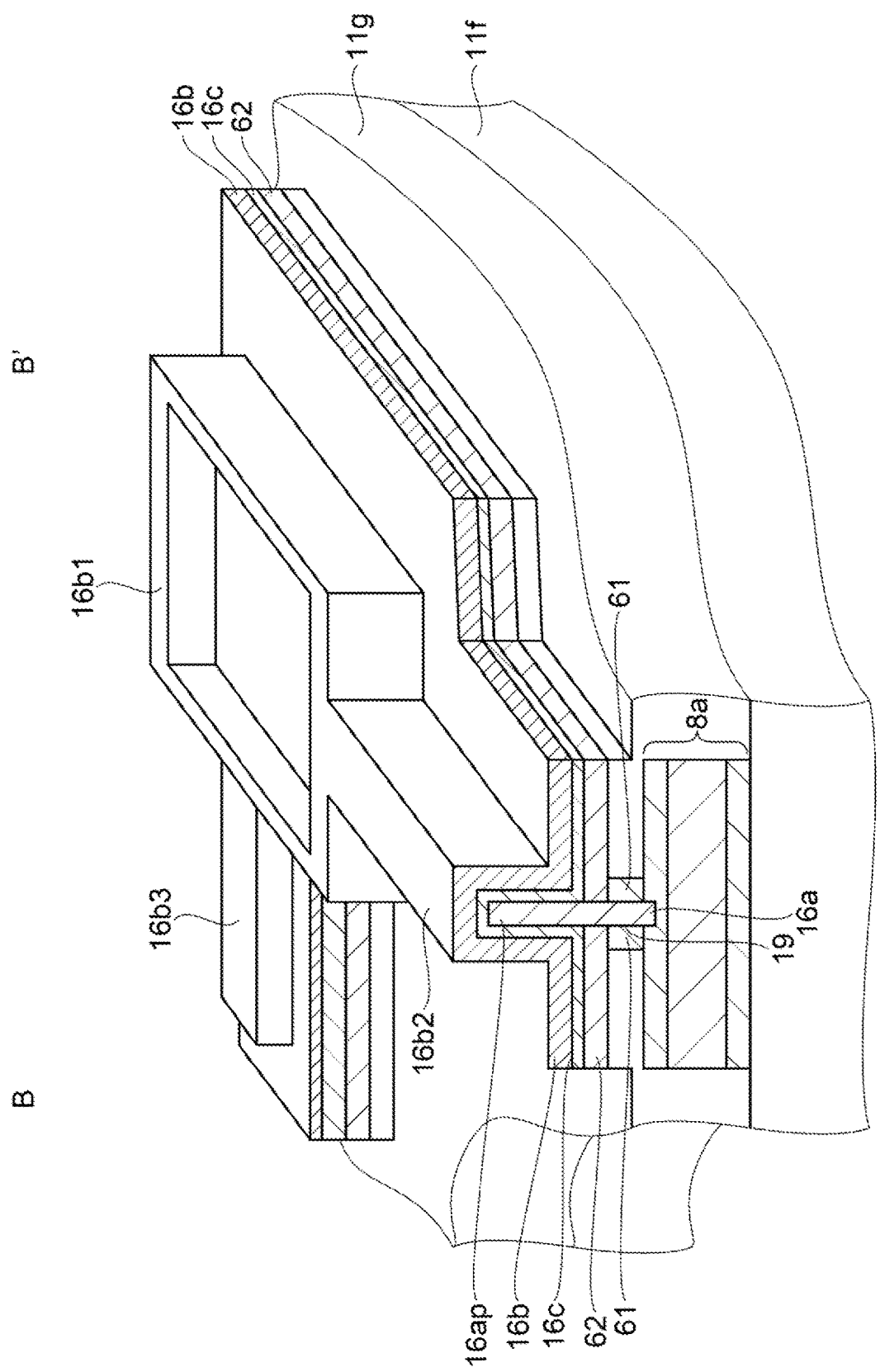
FIG. 7 is a perspective view illustrating an overall configuration of the capacitance element, including a cross section taken along line B-B' in FIG. 6.

FIG. 6 is a plan view illustrating a planar configuration of a capacitance element in a pixel of an element substrate. FIG. 7 is a perspective view illustrating a schematic overall configuration of the capacitance element, including a cross-section of the capacitance element illustrated in FIG. 6 taken along line B-B'.

In FIG. 6, the light shielding region S includes the capacitance line 8a and the relay layer 51. A one-dot chain line indicates the outer shape line of the capacitance line 8a and a two-dot chain line indicates the outer shape line of the relay layer 51.

The capacitance line 8a includes portions corresponding to the first extending portion S1, the second extending portion S2, and the wide portion S3 of the light shielding region S. In the capacitance line 8a, the first extending portion S1 corresponds to a portion extending along the Y axis, the second extending portion S2 corresponds to a portion extending along the X axis, and the wide portion S3 corresponds to a portion where the first extending portion S1 and the second extending portion S2 intersect, and is wider than the first extending portion S1 and the second extending portion S2. The wide portion S3 of the capacitance line 8a is disposed at a position overlapping the channel region 30c of the transistor 30 in plan view.

The capacitance element 16 is disposed overlapping the capacitance line 8a in the light shielding region S.

The opening 19 in which the first capacitance electrode 16a is disposed includes a first opening portion 19a provided in a region overlapping the wide portion S3, a second opening portion 19b provided in a region overlapping the first extending portion S1, and a third opening portion 19c provided in a region overlapping the second extending portion S2.

The first opening portion 19a, of the opening 19, provided in the region overlapping the wide portion S3 has a rectangular annular shape along the outer edge of the wide portion S3. Therefore, in the wide portion S3, the first capacitance electrode 16a disposed in the first opening portion 19a having a rectangular annular shape is also provided in a portion 16a1 having a rectangular annular shape. The second capacitance electrode 16b covering the portion 16a1 having a rectangular annular shape of the first capacitance electrode 16a is disposed to have a convex portion 16b1 having a rectangular annular shape as described below.

The second opening portion 19b and the third opening portion 19c of the opening 19 are provided to be continuous with the first opening portion 19a having a rectangular annular shape. Thus, in the first capacitance electrode 16a, a portion 16a2 provided in a region overlapping the first extending portion S1 and a portion 16a3 provided in a region overlapping the second extending portion S2 are provided to be continuous with the portion 16a1 having a rectangular annular shape of the first capacitance electrode 16a.

Note that the first opening portion 19a, the second opening portion 19b, the third opening portion 19c of the opening 19 may not be continuous. In this case, the first capacitance electrode 16a is divided into three portions that are the portion 16a1, the portion 16a2, and the third portion 16a3 corresponding to the first opening portion 19a, the second opening portion 19b, and the third opening portion 19c, while the portion 16a1, the portion 16a2, and the third portion 16a3 of the first capacitance electrode 16a are electrically coupled to the same capacitance line 8a and covered by the same second capacitance electrode 16b. Thus, the capacitance element 16 can function as one capacitance element.

Note that while the one-dot chain line indicating the outer shape of the capacitance line 8a is drawn to be more on the outer side than the solid line indicating the outer shape of the second capacitance electrode 16b, the width of the capacitance line 8a may be the same as or slightly smaller than that of the second capacitance electrode 16b.

The contact hole CNT5 is disposed at a position overlapping the relay layer 51 in the second extending portion S2 of the light shielding region S. Through the contact hole CNT5, the relay layer 51 and the pixel electrode 27 are electrically coupled to each other.

The contact hole CNT6 is disposed at a position overlapping the second capacitance electrode 16b in the second extending portion S2 of the light shielding region S. Through the contact hole CNT6, the pixel electrode 27 and the second capacitance electrode 16b are electrically coupled to each other.

As illustrated in FIG. 7, the capacitance line 8a is disposed at the interlayer insulation layer 11f. The capacitance line 8a is formed of a plurality of conductive material layers. The interlayer insulation layer 11g and the stopper layer 62 are stacked in this order on the capacitance line 8a.

The first capacitance electrode 16a is disposed in the opening 19 that is formed through the stopper layer 62 and the interlayer insulation layer 11g. Between the first capacitance electrode 16a and the interlayer insulation layer 11g, and between the first capacitance electrode 16a and the stopper layer 62, a spacer 61 for thinning the first capacitance electrode 16a is disposed. The first capacitance electrode 16a is made of, for example, tungsten. The spacer 61 is made of, for example, silicon oxide. The stopper layer 62 is made of, for example, silicon nitride.

The protruding portion 16ap of the first capacitance electrode 16a is provided with the capacitance insulation layer 16c and the second capacitance electrode 16b.

The second capacitance electrode 16b has the convex portion 16b1 having a rectangular annular shape, in a region overlapping the wide portion S3 of the capacitance line 8a. The second capacitance electrode 16b includes a convex portion 16b2 and a convex portion 16b3 that are arranged to be continuous with the convex portion 16b1 having a rectangular annular shape. The capacitance insulation layer 16c is made of, for example, a high dielectric constant material High-K (layered film of alumina and hafnium). The second capacitance electrode 16b is made of a conductive material such as a conductive polysilicon, a metal silicide, a metal, or a metal compound, and is made of titanium nitride (TiN) in the present embodiment.

1.6. Method of Manufacturing Capacitance Element

Figure 8:
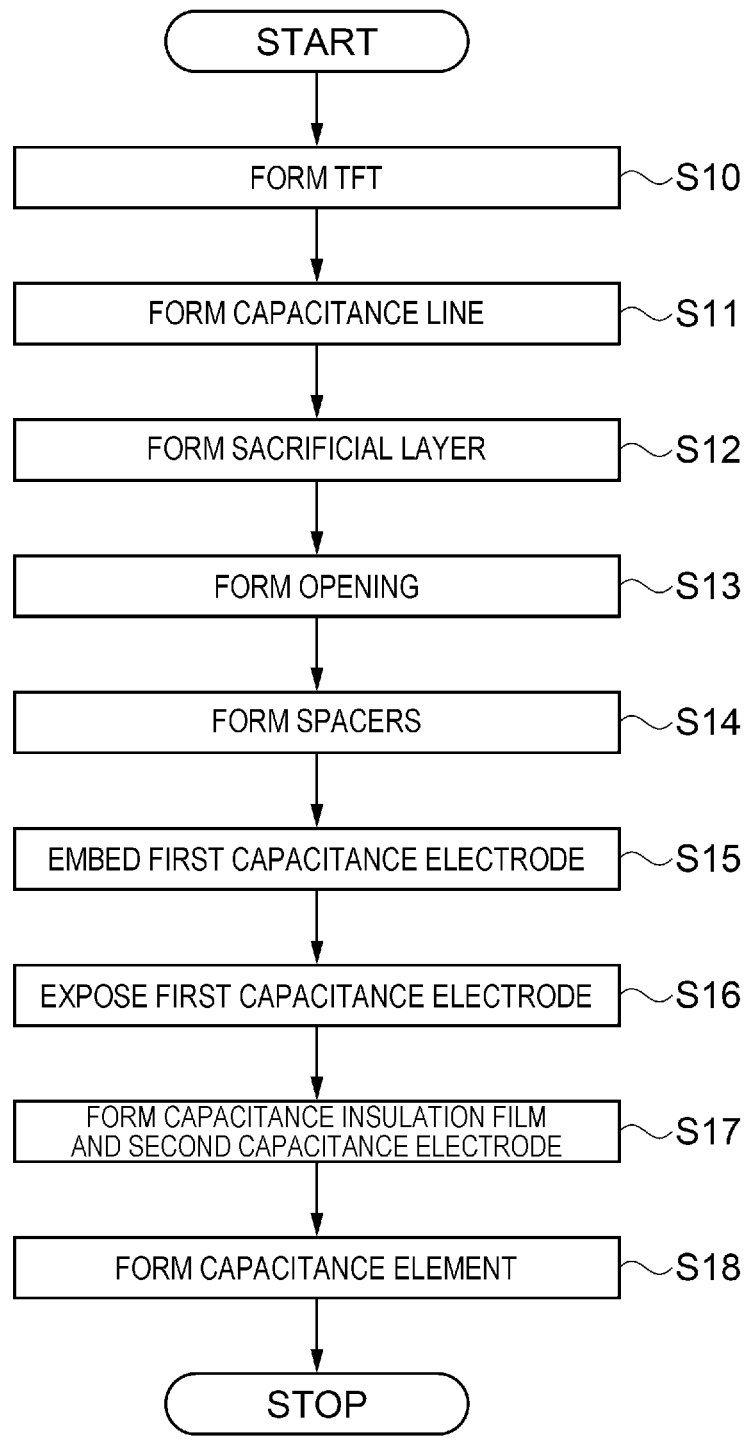
FIG. 8 is a flowchart illustrating a method of manufacturing the capacitance element.
Figure 9A:
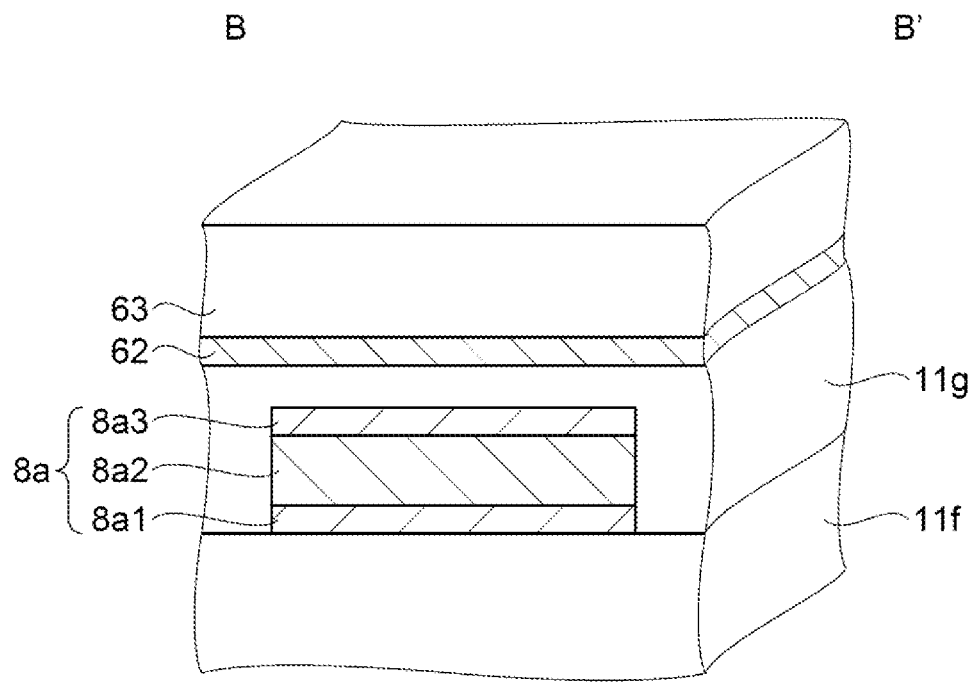
FIG. 9A is a perspective view illustrating a manufacturing process of the capacitance element, including the cross section taken along line B-B' in FIG. 6.
Figure 9B:
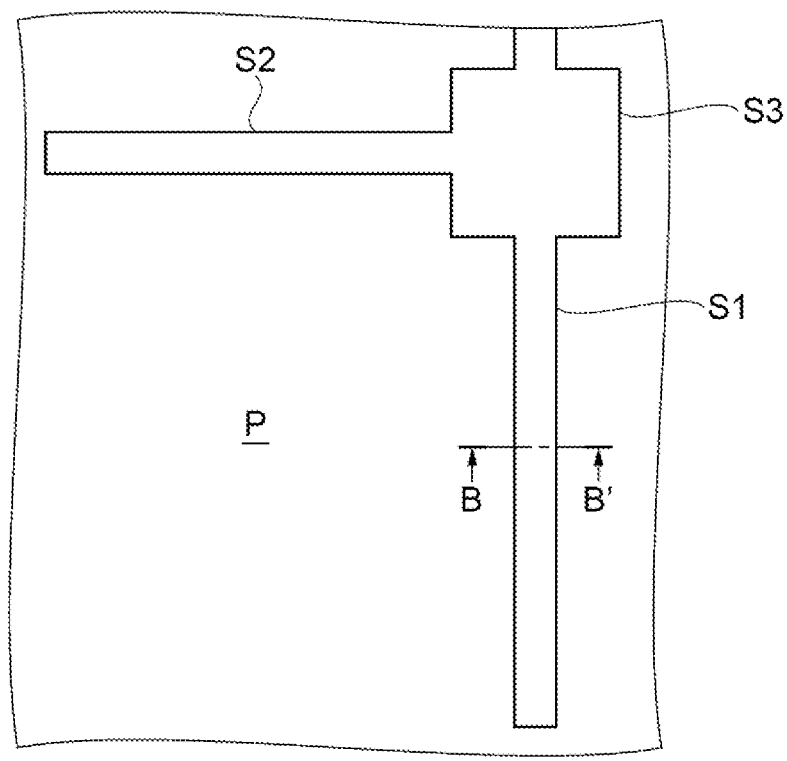
FIG. 9B is a plan view of the capacitance element illustrated in FIG. 9A.
Figure 10A:
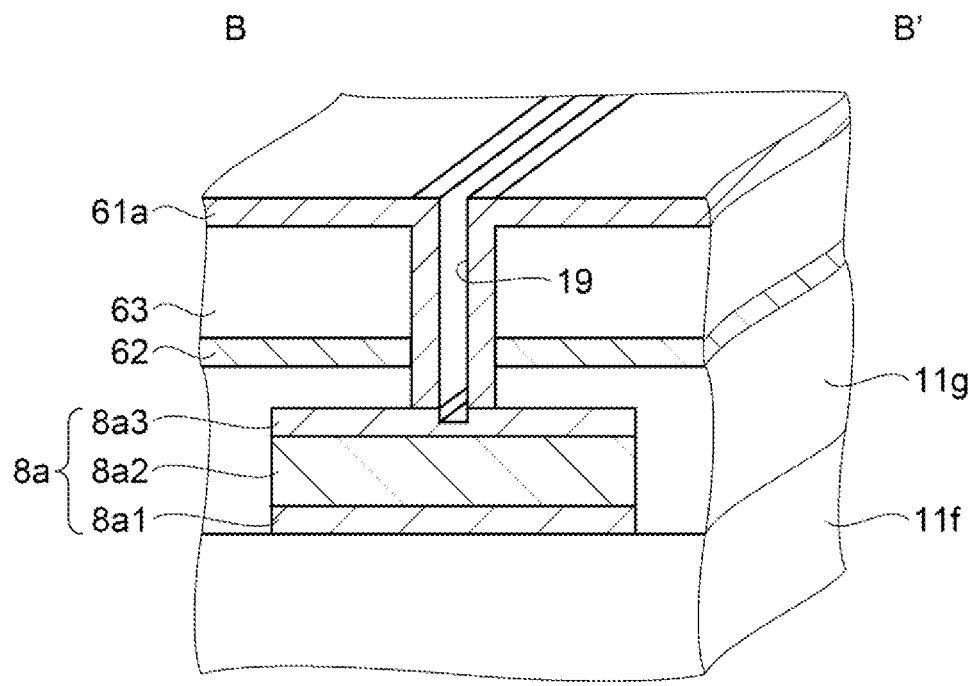
FIG. 10A is a perspective view illustrating a manufacturing process of the capacitance element, including the cross section taken along line B-B' in FIG. 6.
Figure 10B:
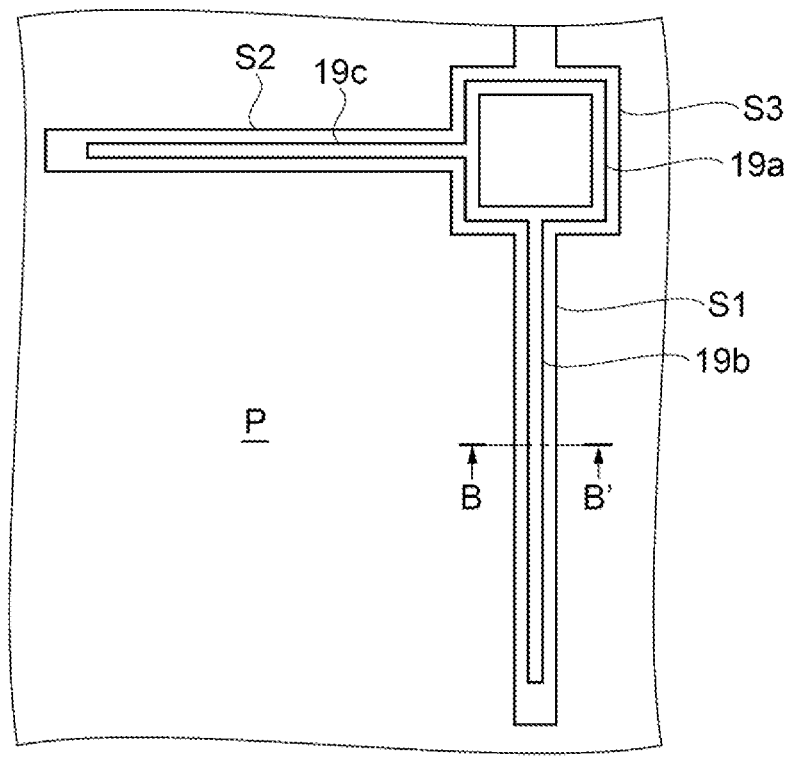
FIG. 10B is a plan view of the capacitance element illustrated in FIG. 10A.

FIG. 8 is a flowchart illustrating a method of manufacturing the capacitance element. FIG. 9A, FIG. 10A, FIG. 11 to FIG. 15 are perspective views including a cross section of the capacitance element viewed at a position along line B-B' in FIG. 6. FIG. 9B and FIG. 10B are plan views illustrating a planar structure of a pixel. A description on the method of manufacturing the capacitance element 16 will be given with reference to the flowchart in FIG. 8, and FIG. 9 to FIG. 15 each illustrating the states of the capacitance element 16 in respective manufacturing processes.

After the interlayer insulation layer 11a, the lower-side light-shielding layer 3b, and the interlayer insulation layer 11b have been formed at the substrate 10a, in step S10, the transistor 30 is formed at the substrate 10a. Thereafter, the scanning lines 3a, the data lines 6a, the interlayer insulation layers 11c to 11f are formed at the transistor 30, and the contact holes CNT1, CNT2, CNT3, and CNT4 are formed in the interlayer insulation layers.

In step S11, the capacitance lines 8a are formed at the interlayer insulation layer 11f. As illustrated in FIG. 9A, a tungsten silicide layer 8a1, an aluminum layer 8a2, and a tungsten silicide layer 8a3 are formed in this order on the interlayer insulation layer 11f, and are patterned as illustrated in FIG. 9B, whereby the capacitance lines 8a are formed to have a shape including the first extending portion S1, the second extending portion S2, and the wide portion S3.

In step S12, as illustrated in FIG. 9A, the interlayer insulation layer 11g, the stopper layer 62, and a sacrificial layer 63 are formed in this order to cover the capacitance lines 8a and the interlayer insulation layer 11f. The sacrificial layer 63 is made of silicon oxide, for example.

In step S13, the groove-shaped opening 19 is formed in the sacrificial layer 63 at a position overlapping the capacitance line 8a. As illustrated in FIG. 10A, the opening 19 is formed through the sacrificial layer 63, the stopper layer 62, and the interlayer insulation layer 11g to expose the capacitance line 8a. The opening 19 is formed in a shape with the depth being longer than the width.

FIG. 10B illustrates a planar shape of the opening 19. The opening 19 includes the first opening portion 19a that has a rectangular annular shape and is provided in a region overlapping the wide portion S3, the second opening portion 19b provided in a region overlapping the first extending portion S1, and the third opening portion 19c provided in a region overlapping the second extending portion S2.

In step S14, as illustrated in FIG. 10A, a spacer layer 61a made of silicon oxide is formed, by Atomic Layer Deposition (ALD), in the opening 19 and on the sacrificial layer 63. The spacer layer 61a is provided to reduce the width of the opening 19 to reduce the width of the first capacitance electrode 16a provided in the opening 19.

Figure 11:
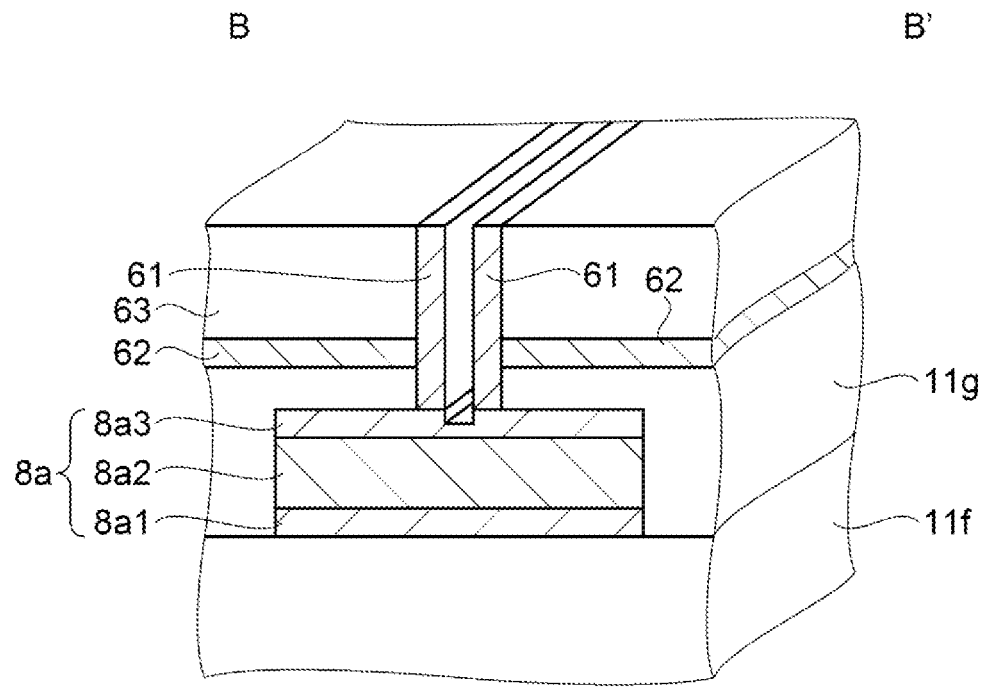
FIG. 11 is a perspective view illustrating a manufacturing process of the capacitance element, including the cross section taken along line B-B' in FIG. 6.

As illustrated in FIG. 11, anisotropic etching is performed on the spacer layer 61a to remove the spacer layer 61a on the sacrificial layer 63 and the spacer layer 61a at the bottom of the opening 19. As a result, the bottom of the opening 19 is exposed, and the spacer 61 is formed only at the side walls of the opening 19.

Figure 12:
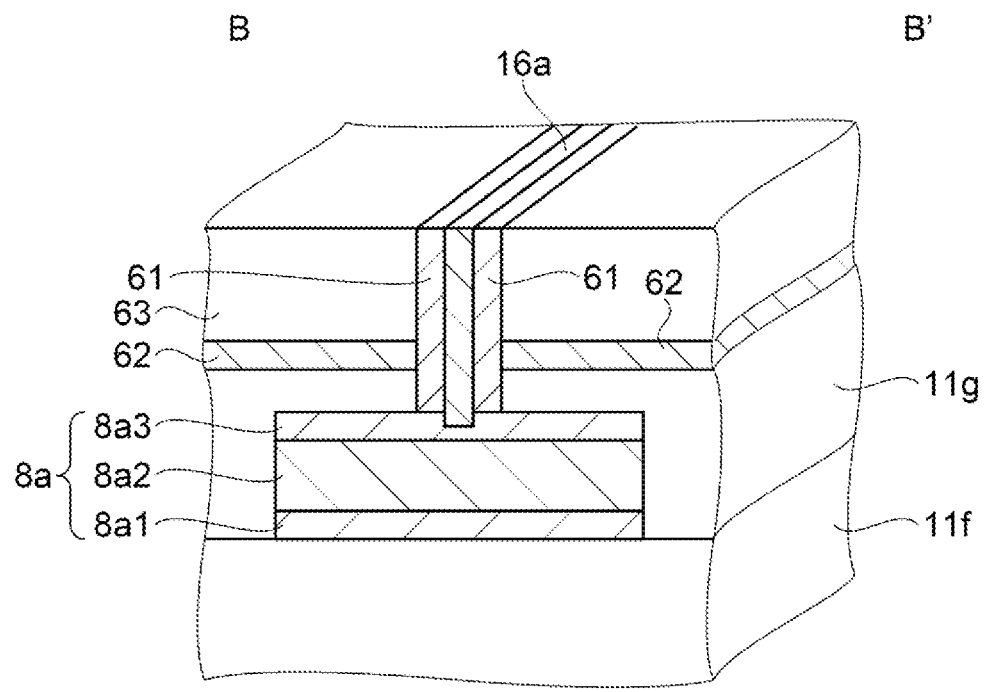
FIG. 12 is a perspective view illustrating a manufacturing process of the capacitance element, including the cross section taken along line B-B' in FIG. 6.

In step S15, as illustrated in FIG. 12, tungsten, which is the material of the first capacitance electrode 16a, is embedded inside the spacer 61 in the opening 19. The first capacitance electrode 16a is in contact with and is electrically coupled with the capacitance line 8a exposed on the bottom of the opening 19. As illustrated, the first capacitance electrode 16a is formed in a plug-like cross-sectional shape with the depth being longer than the width.

The plug-like shape refers to a shape with a length in the depth direction being longer than that in the width direction. The plug-like shape is preferably a wall shape as illustrated, but may also be a cylindrical shape. Alternatively, in terms of manufacturing process, the plug-like shape refers to a shape formed by the manufacturing processes for the first capacitance electrode 16a illustrated in FIG. 8 to FIG. 15. The first capacitance electrode 16a can be further thinned by increasing the thickness of the spacer 61 in the opening 19.

Figure 13:
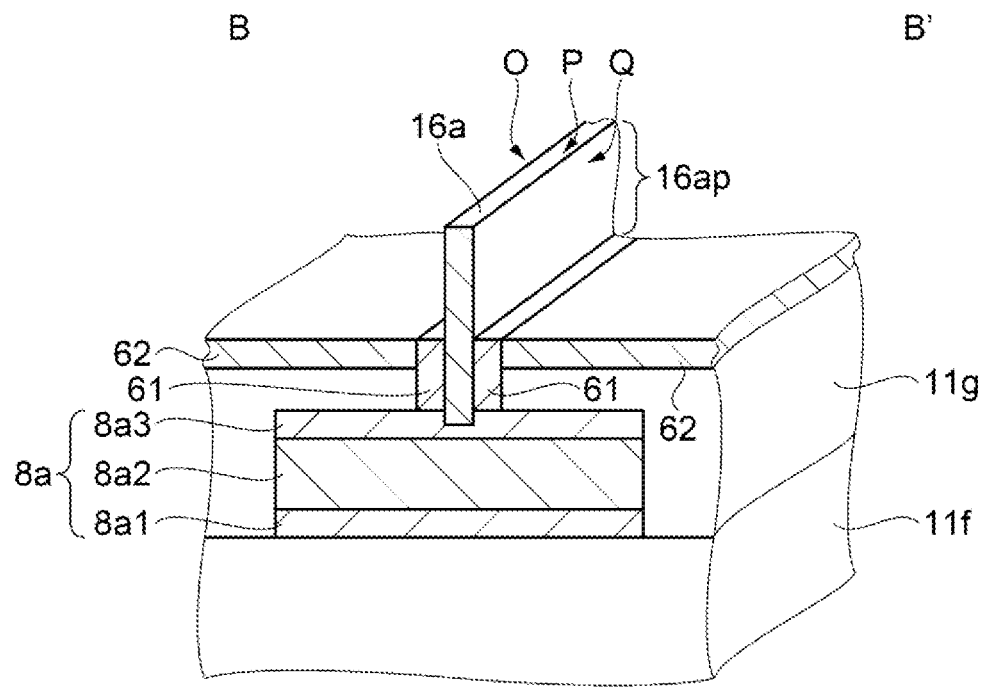
FIG. 13 is a perspective view illustrating a manufacturing process of the capacitance element, including the cross section taken along line B-B' in FIG. 6.

In step S16, the portion of the first capacitance electrode 16a that protrudes over the stopper layer 62 is exposed, whereby the protruding portion 16ap is formed. The sacrificial layer 63 on the stopper layer 62 is removed as illustrated in FIG. 13. The stopper layer 62 is an etching stopper layer utilizing the selection ratio between the sacrificial layer 63 made of silicon oxide and the stopper layer 62 made of silicon nitride. As a result, the protruding portion 16ap, of the first capacitance electrode 16a, protruding over the stopper layer 62 is exposed. An O surface, a P surface, and a Q surface are three continuous exposed surfaces of the protruding portion 16ap.

Figure 14:
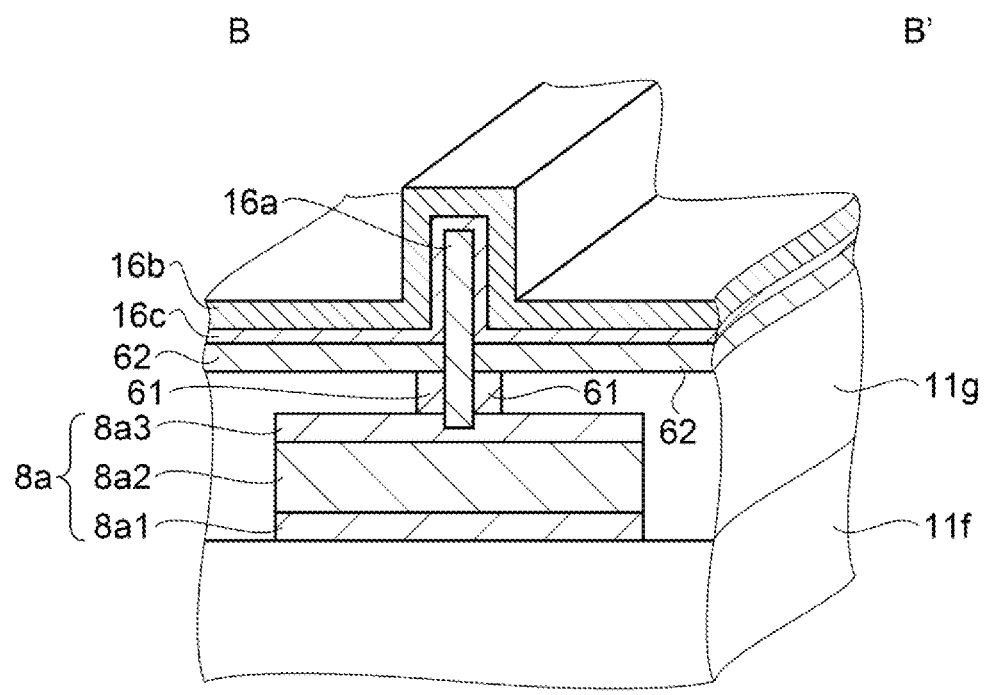
FIG. 14 is a perspective view illustrating a manufacturing process of the capacitance element, including the cross section taken along line B-B' in FIG. 6.

In step S17, the capacitance insulation layer 16c and the second capacitance electrode 16b are formed. As illustrated in FIG. 14, the capacitance insulation layer 16c and the second capacitance electrode 16b are formed in this order to cover the O surface, the P surface, and the Q surface that are the exposed surfaces of the protruding portion 16ap of the first capacitance electrode 16a, the spacer 61, and the stopper layer 62.

Figure 15:
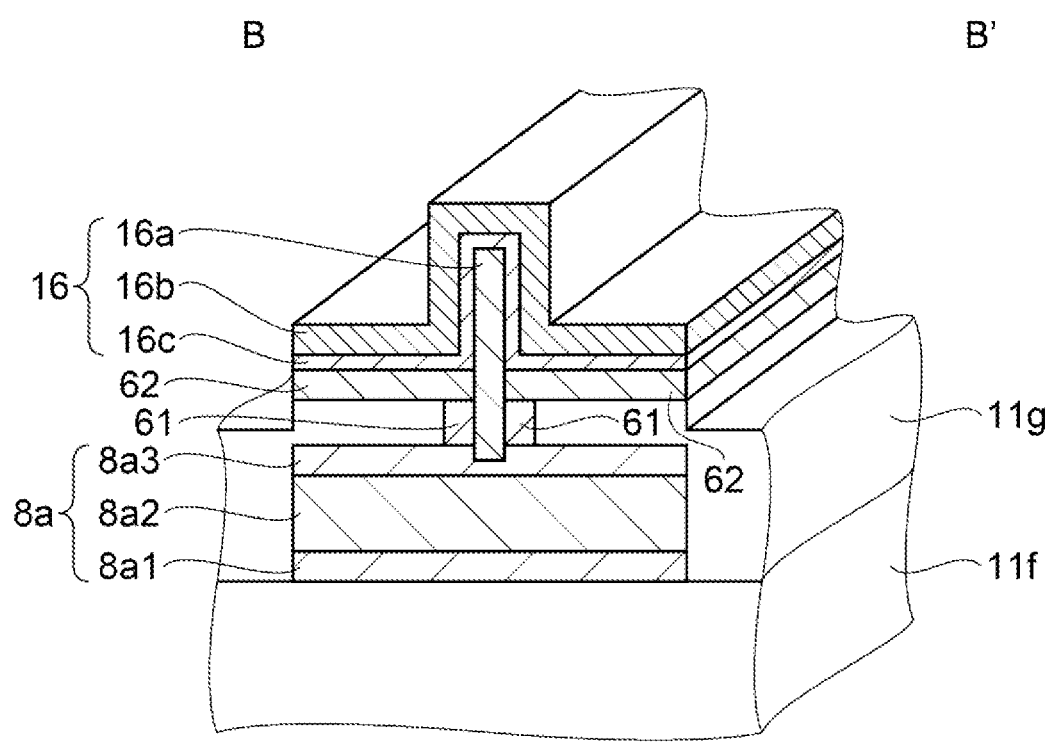
FIG. 15 is a perspective view illustrating a manufacturing process of the capacitance element, including the cross section taken along line B-B' in FIG. 6.

In step S18, the capacitance element 16 is completed. As illustrated in FIG. 15, the second capacitance electrode 16b and the capacitance insulation layer 16c are patterned by etching to have a width substantially the same as the width of the capacitance line 8a and a planar shape as illustrated in FIG. 6. Then, the capacitance element 16 including the first capacitance electrode 16a, the capacitance insulation layer 16c, and the second capacitance electrode 16b is completed.

Thereafter, the interlayer insulation layer 11h is formed to cover the capacitance element 16, and the contact holes CNT5 and CNT6 are formed in the interlayer insulation layer 11h, and the pixel electrodes 27 are formed at the interlayer insulation layer 11h. Finally, the first alignment layer 28 is formed to cover the pixel electrodes 27, whereby the element substrate 10 is completed.

As described above, with the liquid crystal device 100 that is the electro-optical device of the present embodiment, the following advantages can be achieved.

The liquid crystal device 100 that is the electro-optical device includes: the transistor 30 including the semiconductor layer 30a extending along the Y axis extending direction that is the first direction, the light shielding region S that is a light shielding layer including the first extending portion S1 extending along the first direction, and the wide portion S3 overlapping the channel region 30c of the semiconductor layer 30a and provided wider than the first extending portion S1, the interlayer insulation layer 11g provided with the opening 19 in a region overlapping the light shielding region S, and the capacitance element 16 including the first capacitance electrode 16a provided in the opening 19 of the interlayer insulation layer 11g and including a portion protruding over the interlayer insulation layer 11g, and the second capacitance electrode 16b provided to cover the protruding portion 16ap of the first capacitance electrode 16a protruding over the interlayer insulation layer 11g.

In this manner, in the liquid crystal device 100 of the present embodiment, the second capacitance electrode 16b of the capacitance element 16 is provided to cover the protruding portion 16ap, of the first capacitance electrode 16a, protruding over the interlayer insulation layer 11g. Thus, unlike in a known configuration in which a capacitance insulation layer and a capacitance electrode are formed in a fine groove-shaped recessed portion, the second capacitance electrode 16b can be formed at the protruding portion 16ap of the first capacitance electrode 16a easily and with excellent coverage.

Thus, the coverage of the capacitance insulation layer 16c and the second capacitance electrode 16b formed to cover the first capacitance electrode 16a is less likely to be compromised, even when the width of the protruding portion 16ap, of the first capacitance electrode 16a, protruding over the interlayer insulation layer 11g is reduced for miniaturizing the capacitance element 16, or when the length of the protruding portion 16ap, of the first capacitance electrode 16a, protruding over the interlayer insulation layer 11g is increased for increasing the electrostatic capacity of the capacitance element.

As described above, the capacitance element 16 of the present embodiment can be easily miniaturized or have the capacity increased. Therefore, when the capacitance element 16 of the present embodiment is employed in an electro-optical device, an electro-optical device can be obtained in which miniaturization of the capacitance element, required for higher definition, downsizing, higher aperture ratio, and the like, and an increased capacity of the capacitance element, required for suppression of flickering, can be easily achieved. Thus, a highly competitive electro-optical device that is ready for further improvement in performance can be obtained.

The light shielding region S that is the light shielding layer includes the capacitance lines 8a to which a constant potential is applied.

With this configuration, since the first capacitance electrode 16a is disposed in the opening 19 exposing the capacitance line 8a, the layer structure required for electrical coupling between the capacitance line 8a and the first capacitance electrode 16a can be simplified, and a coupling area between the capacitance line 8a and the first capacitance electrode 16a increases, whereby the occurrence of contact failure can be suppressed. Thus, the capacitance element 16 can be easily manufactured, whereby an electro-optical device can be provided in which performance improvement through miniaturization and increase in capacity of the capacitance element 16 can be easily achieved.

The opening 19 is disposed in a region overlapping the wide portion S3.

With this configuration, the opening 19 is disposed in the wide portion S3 overlapping the channel region 30c of the transistor 30, and thus a wide portion can be effectively used for providing the capacitance element 16 with a large capacity.

The capacitance line 8a forming the light shielding layer further includes the second extending portion S2 extending along the second direction intersecting the first direction, that is, the X axis extending direction, and the opening 19 is provided in a region overlapping the wide portion S3, the first extending portion S1, and the second extending portion S2.

With this configuration, a region in which the opening 19 is provided can be made wide, and thus the electrostatic capacity of the capacitance element 16 can be increased.

The pixel electrode 27 provided corresponding to the transistor 30, the contact hole CNT6 serving as a first contact hole for electrically coupling the pixel electrode 27 and the second capacitance electrode 16b, and the contact hole CNT5 serving as a second contact hole for electrically coupling the pixel electrode 27 and the transistor 30 are further included. The contact hole CNT6 and the contact hole CNT5 are disposed in a region overlapping the second extending portion S2 of the capacitance line 8a.

With this configuration, the contact hole CNT5 and the contact hole CNT6, through which the pixel electrode 27 and the transistor 30 are electrically coupled, and the pixel electrode 27 and the capacitance element 16 are electrically coupled, are not provided in a region overlapping the first extending portion S1 and the wide portion S3 that overlaps the transistor 30. Thus, the contact hole CNT5 and the contact hole CNT6 can be easily arranged.

The stopper layer 62 disposed between the second capacitance electrode 16b and the interlayer insulation layer 11g is further included. The portion of the first capacitance electrode 16a protruding over the interlayer insulation layer 11g includes the protruding portion 16ap protruding over the stopper layer 62. The length of the protruding portion 16ap protruding over the stopper layer 62 is longer than the width of the protruding portion 16ap protruding over the stopper layer 62.

With this configuration, by the stopper layer 62, the length of the protruding portion of the first capacitance electrode 16a can be a desired length longer than the width of the protruding portion, whereby the capacitance element 16 can be accuracy formed to have a larger electrostatic capacity. For example, when the capacitance element 16 is a pixel capacitance of a display device, the capacitance elements 16 of the respective pixels can have the same electrostatic capacity, whereby display quality can be improved.

In the opening 19, the spacer 61 is disposed between the stopper layer 62 and the first capacitance electrode 16a.

With this configuration, the width of the opening 19 can be reduced by the spacer 61, and thus the first capacitance electrode 16a can be further miniaturized.

The method of manufacturing the liquid crystal device 100 that is the electro-optical device includes: step S10 of forming the transistor 30 at the substrate 10a, step S11 of forming, at the substrate 10a, the capacitance line 8a that is a light shielding layer including the first extending portion S1 extending along the first direction, and the wide portion S3 including a region overlapping the channel region 30c of the transistor 30 provided wider than the first extending portion S1, step S12 of forming the interlayer insulation layer 11g, the stopper layer 62, and the sacrificial layer 63 in this order at the capacitance line 8a, step S13 of forming the opening 19 in the sacrificial layer 63, the stopper layer 62, and the interlayer insulation layer 11g to reach the capacitance line 8a, step S14 of forming the spacer 61 at the inner walls of the opening 19, step S15 of forming the first capacitance electrode 16a that is in contact with the wide portion S3 in the opening including the spacer 61, step S16 of exposing part of the first capacitance electrode 16a by removing the sacrificial layer 63 and the spacer 61 at the stopper layer 62, and step S17 and step S18 of forming the capacitance element 16 including the first capacitance electrode 16a, the capacitance insulation layer 16c, and the second capacitance electrode 16b by forming the capacitance insulation layer 16c and the second capacitance electrode 16b to cover the exposed protruding portion 16ap of the first capacitance electrode 16a.

With this manufacturing method, the second capacitance electrode 16b is formed after a part of the first capacitance electrode 16a protrudes from the interlayer insulation layer 11g, to cover this protruding portion 16ap. Thus, unlike in a known configuration in which a capacitance insulation layer and a capacitance electrode are formed in a fine groove-shaped recessed portion, the second capacitance electrode 16b can be formed at the protruding portion 16ap of the first capacitance electrode 16a easily and with excellent coverage.

Thus, the coverage of the capacitance insulation layer 16c and the second capacitance electrode 16b formed to cover the first capacitance electrode 16a is less likely to be compromised, even when the width of the protruding portion 16ap of the first capacitance electrode 16a is reduced for miniaturizing the capacitance element 16, or when the length of the protruding portion 16ap of the first capacitance electrode 16a is increased for increasing the electrostatic capacity of the capacitance element 16.

Thus, an electro-optical device can be provided in which performance improvement through miniaturization and increase in capacity of the capacitance element 16 can be easily achieved.

2. Second Embodiment

Figure 23:
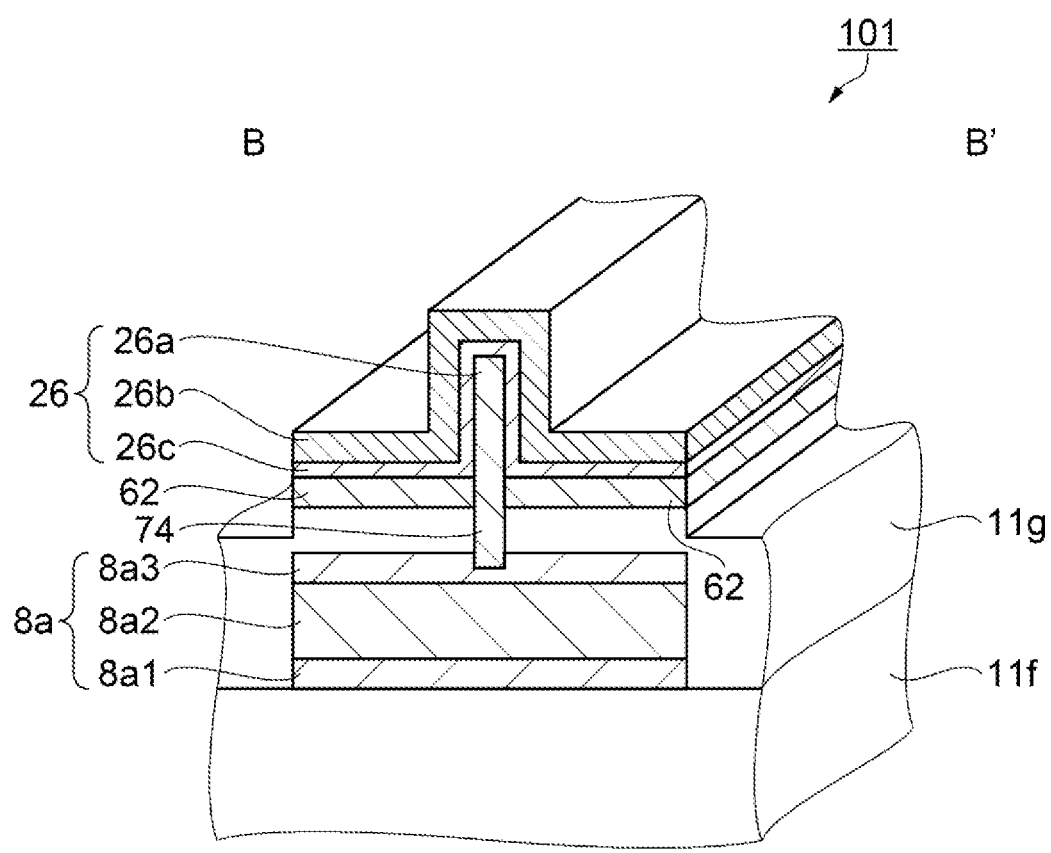
FIG. 23 is a perspective view illustrating a manufacturing process of a capacitance element, including the cross section taken along line B-B' in FIG. 6.

FIG. 23 is a perspective view of a capacitance element, including a cross section viewed at a position along line B-B' illustrated in FIG. 6.

In the present embodiment, a capacitance element 26 according to an embodiment different from the capacitance element 16 according to the first embodiment is described. Note that, in the description below, redundant explanations are omitted, with the configurations and the processes that are the same as those in the first embodiment denoted with the same reference numerals.

2.1. Summary of Capacitance Element

As illustrated in FIG. 23, the capacitance element 26 of a liquid crystal device 101 according to the present embodiment differs from the capacitance element 16 of the liquid crystal device 100 according to the first embodiment in that the spacer 61 is not provided in the opening 19 in which a first capacitance electrode 26a is disposed. A manufacturing method according to the present embodiment differs from the manufacturing method according to the first embodiment in that a step of forming an opening 74, in which the first capacitance electrode 26a is embedded, is performed using a hard mask 71 including spacer 73.

As illustrated in FIG. 23, the capacitance element 26 includes the first capacitance electrode 26a, a capacitance insulation layer 26c, and a second capacitance electrode 26b, as in the capacitance element 16 according to the first embodiment. The first capacitance electrode 26a is disposed in the opening 74 of the interlayer insulation layer 11g disposed at the capacitance line 8a, and the capacitance insulation layer 26c and the second capacitance electrode 26b are disposed to cover a portion of the first capacitance electrode 26a protruding over the stopper layer 62. The first capacitance electrode 26a is made of, for example, tungsten. The second capacitance electrode 26b is made of, for example, titanium nitride. The capacitance insulation layer 26c is made of, for example, High-K. Note that the arrangement layout of the opening 74, the first capacitance electrode 26a, and the second capacitance electrode 26b in plan view is the same as that in the configuration of the capacitance element 16 illustrated in FIG. 6.

The first capacitance electrode 26a is disposed so as to be in direct contact with the interlayer insulation layer 11g and the stopper layer 62 in the opening 74. In other words, the capacitance element 26 does not include the spacer 61 included in the capacitance element 16 according to the first embodiment. In the first embodiment, the spacer 61 is provided to make the first capacitance electrode 16a thin. Thus, in the present embodiment without the spacer 61, the capacitance element 26 is made as thin as the capacitance element 16 according to the first embodiment, with the manufacturing method to thin the first capacitance electrode 26a.

2.2. Method of Manufacturing Capacitance Element

Figure 16:
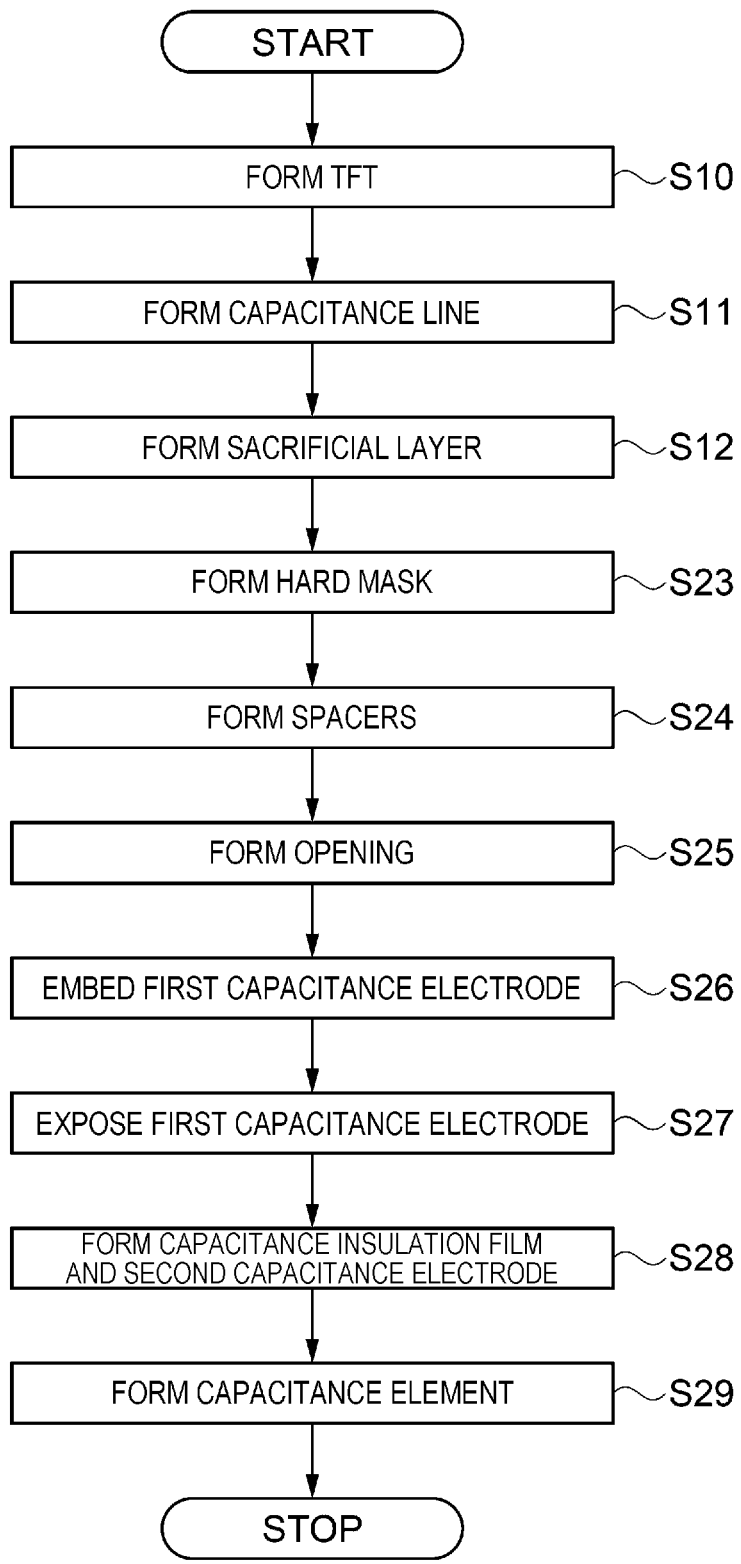
FIG. 16 is a flowchart illustrating a method of manufacturing a capacitance element according to a second embodiment.

FIG. 16 is a flowchart illustrating a method of manufacturing a capacitance element according to the second embodiment. FIG. 17 to FIG. 23 are perspective views illustrating respective manufacturing processes of the capacitance element, including a cross section of the capacitance element 26 viewed at a position along line B-B' in FIG. 6. A description on the method of manufacturing the capacitance element 26 will be given with reference to the flowchart in FIG. 16, and FIG. 17 to FIG. 23 each illustrating the states of the capacitance element 26 in respective manufacturing processes.

With the manufacturing processes in step S10 to step S12 in FIG. 16, the stopper layer 62 and the sacrificial layer 63 are formed at the capacitance lines 8a as in the first embodiment.

Figure 17:
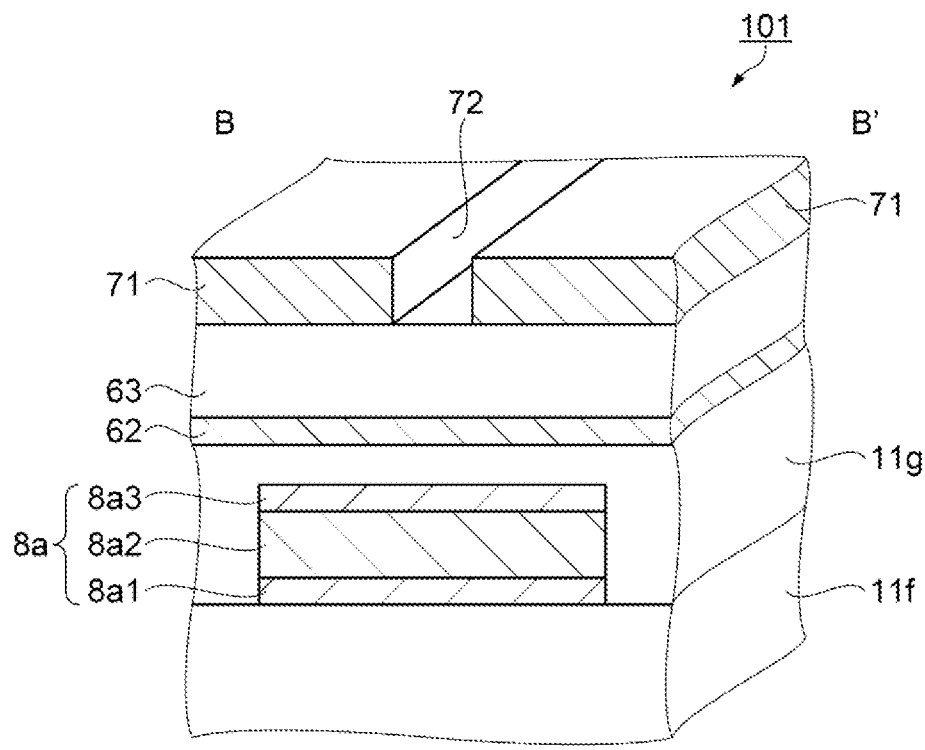
FIG. 17 is a perspective view illustrating a manufacturing process of the capacitance element, including the cross section taken along line B-B' in FIG. 6.

In step S23, the hard mask 71 made of tungsten silicide or the like is formed at the sacrificial layer 63. As illustrated in FIG. 17, the hard mask 71 is formed to have a groove-shaped opening 72 at a position where the first capacitance electrode 26a is formed.

Figure 18:
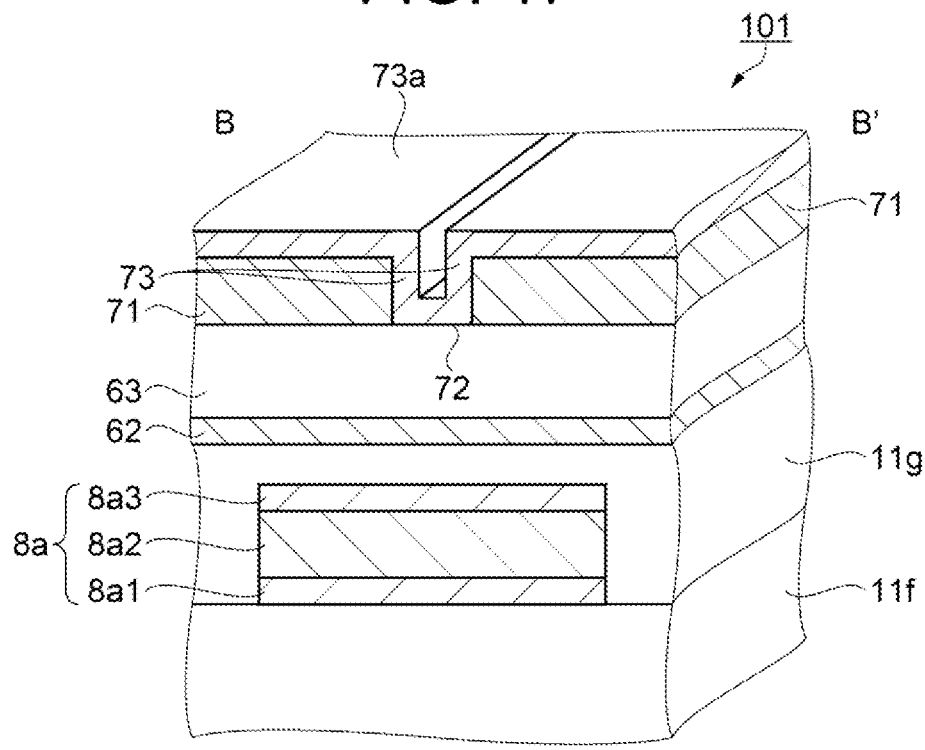
FIG. 18 is a perspective view illustrating a manufacturing process of the capacitance element, including the cross section taken along line B-B' in FIG. 6.

In step S24, as illustrated in FIG. 18, a spacer layer 73a is formed in the hard mask 71 and the opening 72. The spacer layer 73a is made of silicon oxide and is formed by ALD. By forming the layer by ALD, the portions formed at the inner walls of the opening 72 can function as the spacer 73 to reduce the width of the opening 72. Thus, with the opening 74 described below formed using the hard mask 71 including the spacer 73, the opening 74 can have a small groove width, whereby the first capacitance electrode 26a formed in the opening 74 can be made thin.

Figure 19:
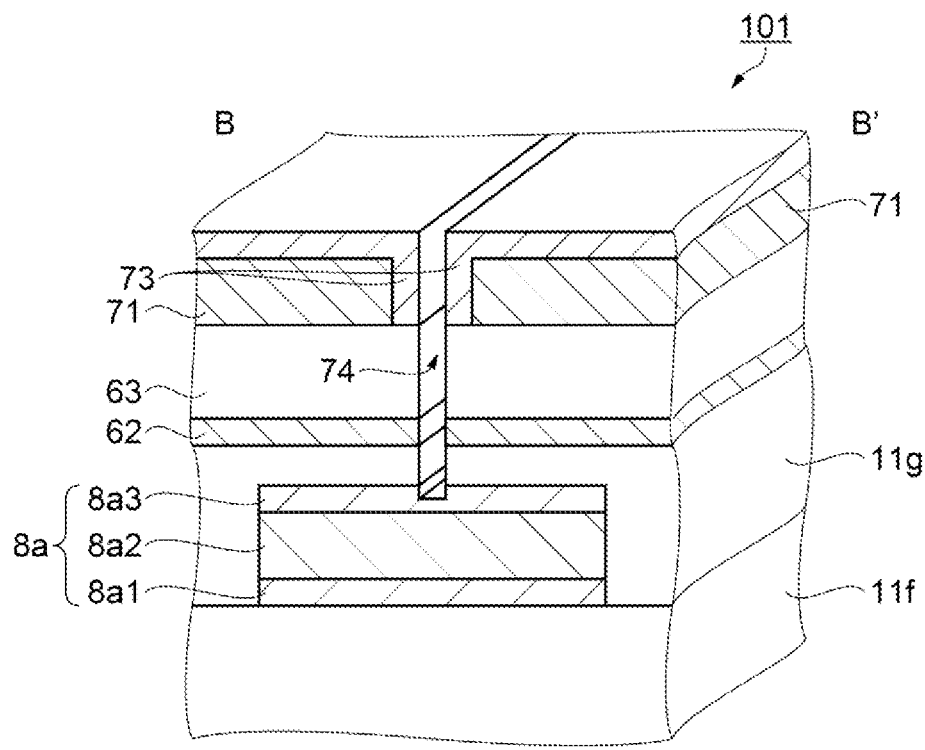
FIG. 19 is a perspective view illustrating a manufacturing process of the capacitance element, including the cross section taken along line B-B' in FIG. 6.

In step S25, the groove-shaped opening 74 is formed in the sacrificial layer 63 at a position overlapping the capacitance line 8a, using the hard mask 71 including the spacer 73. As illustrated in FIG. 19, the opening 74 is formed through the sacrificial layer 63, the stopper layer 62, and the interlayer insulation layer 11g to expose the capacitance line 8a. The opening 74 is formed in a shape with the depth being longer than the width.

Figure 20:
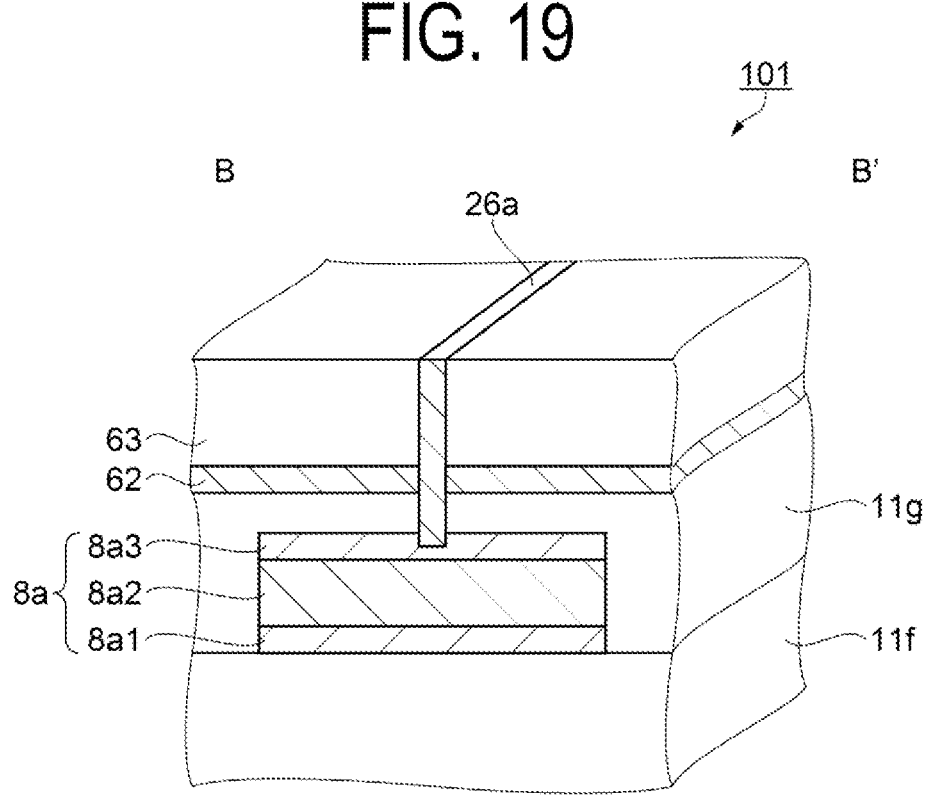
FIG. 20 is a perspective view illustrating a manufacturing process of the capacitance element, including the cross section taken along line B-B' in FIG. 6.

In step S26, as illustrated in FIG. 20, tungsten, which is the material of the first capacitance electrode 26a, is embedded in the opening 74. The first capacitance electrode 26a is in contact with and is electrically coupled with the capacitance line 8a exposed on the bottom of the opening 74. As illustrated in FIG. 20, the first capacitance electrode 26a is formed in a plug-like cross-sectional shape with the depth being longer than the width.

Figure 21:
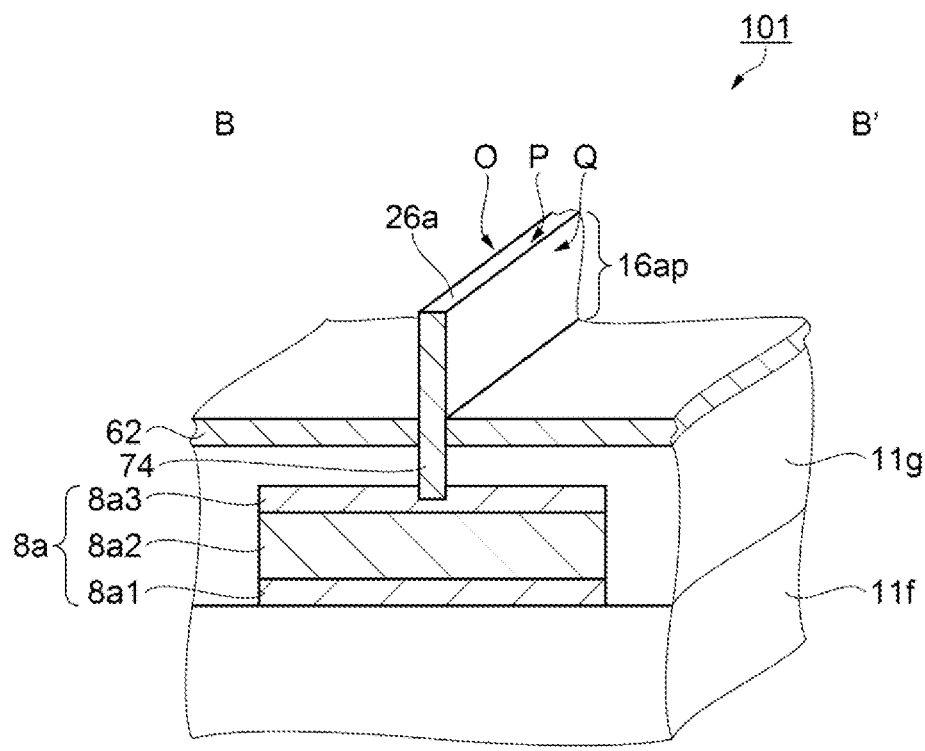
FIG. 21 is a perspective view illustrating a manufacturing process of the capacitance element, including the cross section taken along line B-B' in FIG. 6.

In step S27, as illustrated in FIG. 21, the portion of the first capacitance electrode 26a that protrudes over the stopper layer 62 is exposed, whereby a protruding portion 26ap is formed. In the present embodiment, the first capacitance electrode 26a is in direct contact with the interlayer insulation layer 11g and the stopper layer 62 in the opening 74, because the spacer 61 illustrated in the first embodiment are not provided in the opening 74.

Figure 22:
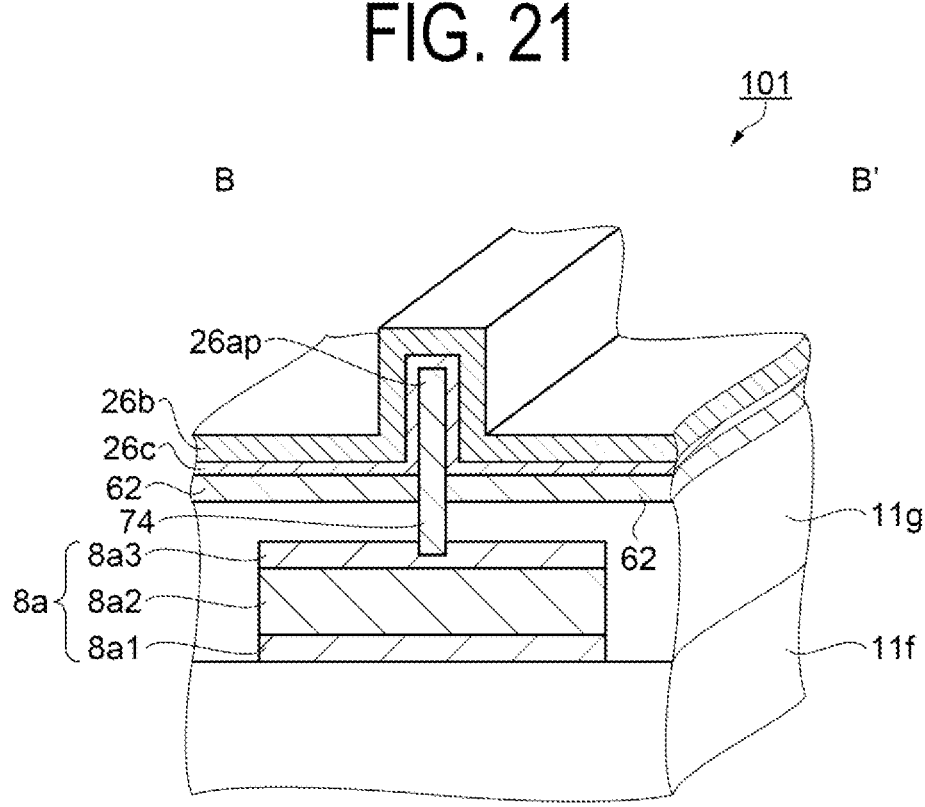
FIG. 22 is a perspective view illustrating a manufacturing process of the capacitance element, including the cross section taken along line B-B' in FIG. 6.

In step S28, the capacitance insulation layer 26c and the second capacitance electrode 26b are formed. As illustrated in FIG. 22, the capacitance insulation layer 26c and the second capacitance electrode 26b are formed in this order to cover the O surface, the P surface, and the Q surface that are the exposed surfaces of the protruding portion 26ap of the first capacitance electrode 26a.

In step S29, the capacitance element 26 is completed. As illustrated in FIG. 23, the second capacitance electrode 26b and the capacitance insulation layer 26c are patterned by etching to have a width substantially the same as the width of the capacitance line 8a and a planar shape as illustrated in FIG. 6. Then, the capacitance element 26 including the first capacitance electrode 26a, the capacitance insulation layer 26c, and the second capacitance electrode 26b is completed.

As described above, with the liquid crystal device 101 that is the electro-optical device of the present embodiment, the following advantages can be achieved.

The liquid crystal device 101 that is the electro-optical device includes: the transistor 30 including the semiconductor layer 30a extending along the Y axis extending direction that is the first direction, the light shielding region S that is a light shielding layer including the first extending portion S1 extending along the first direction, and the wide portion S3 overlapping the channel region 30c of the semiconductor layer 30a and provided wider than the first extending portion S1, the interlayer insulation layer 11g provided with the opening 74 in a region overlapping the light shielding region S, the capacitance element 26 including the first capacitance electrode 26a provided in the opening 74 of the interlayer insulation layer 11g and including a portion protruding over the interlayer insulation layer 11g, and the second capacitance electrode 26b provided to cover the protruding portion 26ap of the first capacitance electrode 26a protruding over the interlayer insulation layer 11g, and the stopper layer 62 formed between the second capacitance electrode 26b and the interlayer insulation layer 11g. The portion of the first capacitance electrode 26a protruding over the interlayer insulation layer 11g includes the protruding portion 26ap protruding over the stopper layer 62. The length of the protruding portion 26ap protruding over the stopper layer 62 is longer than the width of the protruding portion 26ap protruding over the stopper layer 62. In the opening 74, the stopper layer and the first capacitance electrode are in contact with each other.

In this manner, in the liquid crystal device 101 of the present embodiment, the second capacitance electrode 26b of the capacitance element 26 is provided to cover the protruding portion 26ap, of the first capacitance electrode 26a, protruding over the interlayer insulation layer 11g, as with the capacitance element 16 according to the first embodiment. Thus, as in the first embodiment, the second capacitance electrode 26b can be formed at the protruding portion 26ap of the first capacitance electrode 26a easily and with excellent coverage.

The first capacitance electrode 26a is formed so as to be in direct contact with the interlayer insulation layer 11g and the stopper layer 62 in the opening 74. In other words, the capacitance element 26 does not include the spacer 61 included in the capacitance element 16 according to the first embodiment. In the first embodiment, the spacer 61 is provided to make the first capacitance electrode 16a thin. Thus, in the present embodiment without the spacer 61, the capacitance element 26 is made as thin as the capacitance element 16 according to the first embodiment, with the manufacturing method to thin the first capacitance electrode 26a.

The method of manufacturing the liquid crystal device 101 that is the electro-optical device according to the present embodiment includes: step S10 of forming the transistor 30 at the substrate 10a, step S11 of forming, at the substrate 10a, the capacitance line 8a that is a light shielding layer including the first extending portion S1 extending along the first direction, and the wide portion S3 including a region overlapping the channel region 30c of the transistor 30 provided wider than the first extending portion S1, step S12 of forming the interlayer insulation layer 11g, the stopper layer 62, and the sacrificial layer 63 in this order at the capacitance line 8a, step S23 of forming the hard mask 71 provided with the opening 72 at a position at the sacrificial layer 63 corresponding to the capacitance line 8a, step S24 of forming the spacer 73 at the inner walls of the opening 72 in the hard mask 71, step S25 of forming the opening 74 in the sacrificial layer 63, the stopper layer 62, and the interlayer insulation layer 11g to reach the capacitance line 8a using the hard mask 71, step S26 of forming the first capacitance electrode 26a that is in contact with the capacitance line 8a in the opening 74, step S27 of exposing part of the first capacitance electrode 26a by removing the sacrificial layer 63 at the stopper layer 62, and step S28 and step S29 of forming the capacitance element 26 including the first capacitance electrode 26a, the capacitance insulation layer 26c, and the second capacitance electrode 26b by forming the capacitance insulation layer 26c and the second capacitance electrode 26b to cover the exposed first capacitance electrode 26a.

The manufacturing method according to the present embodiment includes the step of forming the opening 74, in which the first capacitance electrode 26a is embedded, is performed using the hard mask 71 including the spacer 73, whereby the first capacitance electrode 26a formed in the opening 74 can be made thin as in the first embodiment.

As in the first embodiment, the second capacitance electrode 26b is formed after a part of the first capacitance electrode 26a protrudes over the interlayer insulation layer 11g, to cover this protruding portion 26ap.

Thus, as in the first embodiment, the second capacitance electrode 26b can be formed at the protruding portion 26ap of the first capacitance electrode 26a easily and with excellent coverage. Thus, with the present embodiment, yield improved over the first embodiment can be expected. This is because, due to the absence of the spacer 61 between the first capacitance electrode 26a and the stopper layer 62, in the process of partially exposing the first capacitance electrode 26a, the spacer 61 between the first capacitance electrode 26a and the stopper layer 62 are etched, resulting in no groove formed in a base portion of the protruding portion 26ap.

3. Third Embodiment

Figure 26:
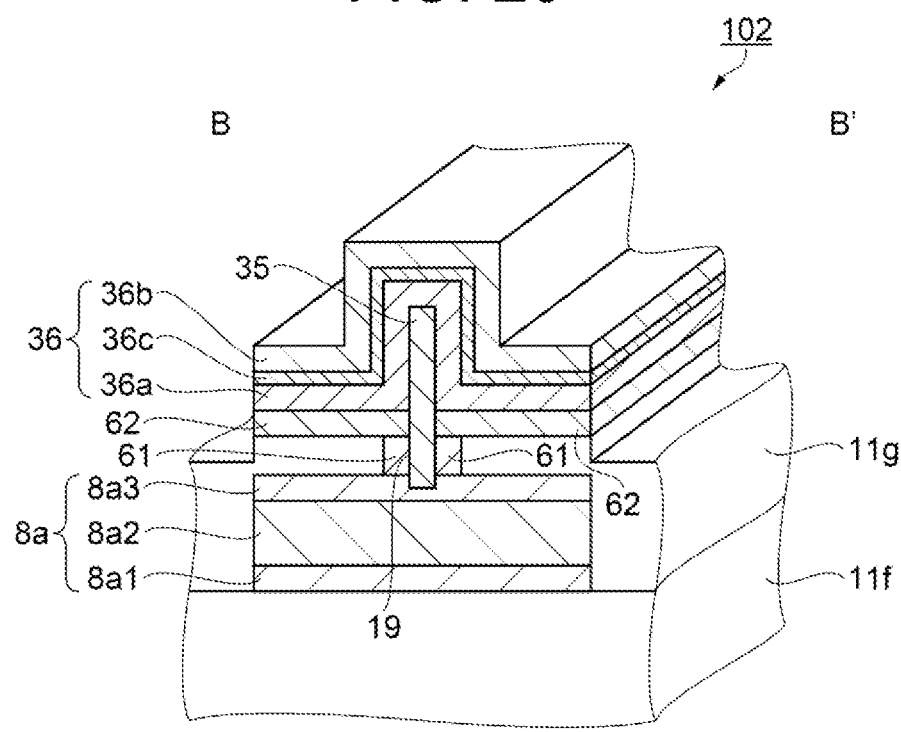
FIG. 26 is a perspective view illustrating a manufacturing process of the capacitance element, including the cross section taken along line B-B' in FIG. 6.

FIG. 26 is a perspective view of a capacitance element, including a cross section viewed at a position along line B-B' illustrated in FIG. 6. In the present embodiment, a capacitance element 36 according to yet another embodiment different from the capacitance element 16 according to the first embodiment is described. Note that, in the description below, redundant explanations are omitted, with the configurations and the processes that are the same as those in the first embodiment denoted with the same reference numerals.

3.1. Summary of Capacitance Element

As illustrated in FIG. 26, the capacitance element 36 of a liquid crystal device 102 according to the present embodiment differs from the capacitance element 16 of the liquid crystal device 100 according to the first embodiment in that the electrical coupling between the capacitance line 8a and a first capacitance electrode 36a is not achieved by the first capacitance electrode 36a itself, but is achieved by a conductive member 35 that is a member different from the first capacitance electrode 36a.

The conductive member 35 is disposed in the opening 19 of the interlayer insulation layer 11g disposed at the capacitance line 8a. The first capacitance electrode 36a, a capacitance insulation layer 36c, and a second capacitance electrode 36b are disposed to cover a protruding portion 35p of the conductive member 35 protruding over the stopper layer 62. The conductive member 35 is made of, for example, tungsten. The first capacitance electrode 36a and the second capacitance electrode 36b are made of, for example, titanium nitride. The capacitance insulation layer 36c is made of, for example, High-K. Note that the arrangement layout of the opening 19 and the second capacitance electrode 36b in plan view is the same as that in the configuration of the capacitance element 16 illustrated in FIG. 6. The arrangement layout of the first capacitance electrode 36a in plan view is the same as that of the second capacitance electrode 36b.

In the capacitance element 36, the area in which the first capacitance electrode 36a and the second capacitance electrode 36b face each other is larger than the area in which the first capacitance electrode 16a and the second capacitance electrode 16b face each other in the capacitance element 16 according to the first embodiment. Thus, the capacitance element 36 has a larger electrostatic capacity than the capacitance element 16 according to the first embodiment.

3.2. Method of Manufacturing Capacitance Element

Figure 24:
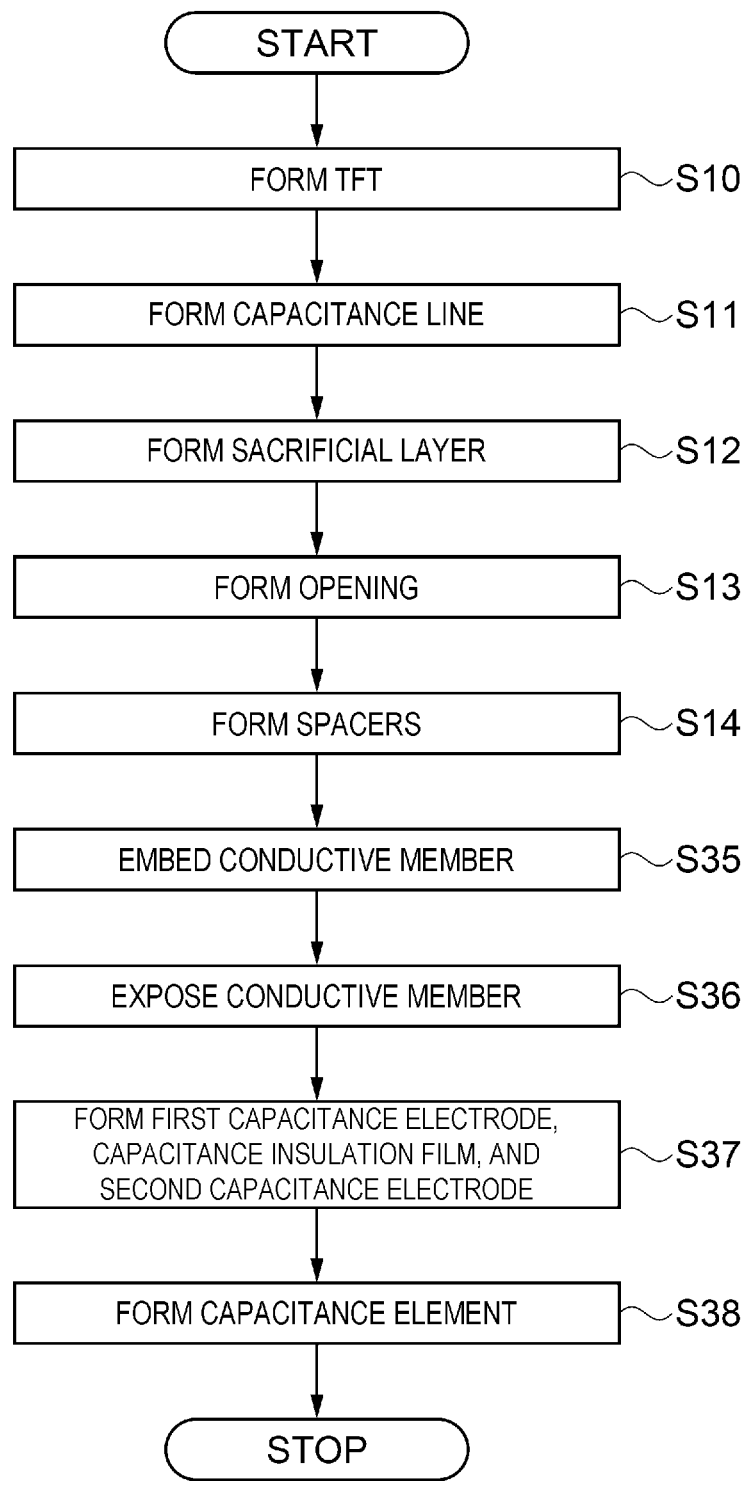
FIG. 24 is a flowchart illustrating a method of manufacturing a capacitance element according to a third embodiment.
Figure 25:
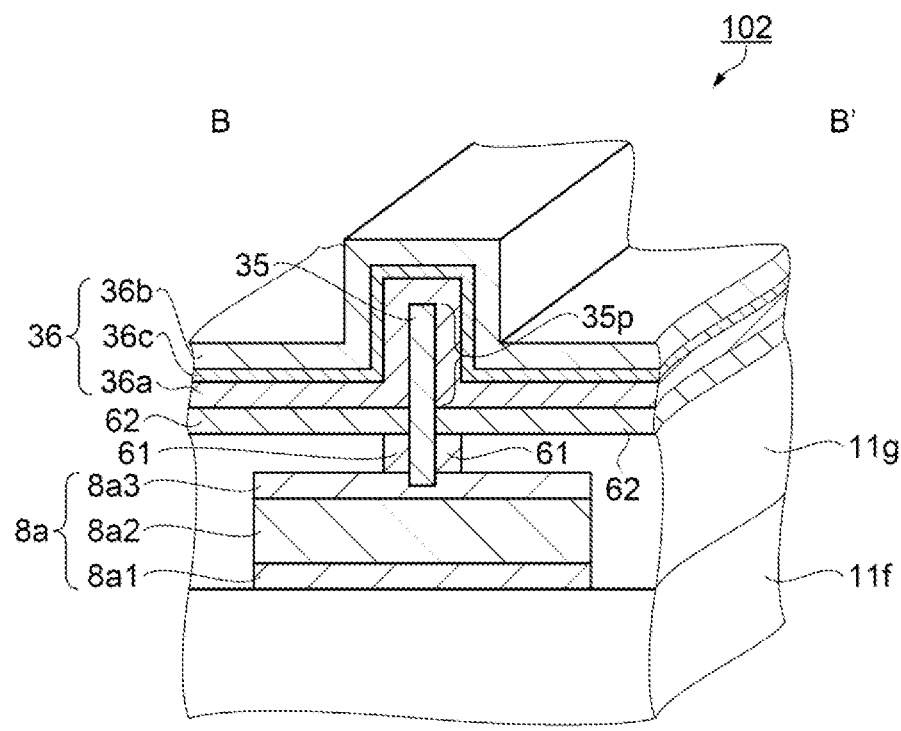
FIG. 25 is a perspective view illustrating a manufacturing process of the capacitance element, including the cross section taken along line B-B' in FIG. 6.

FIG. 24 is a flowchart illustrating a method of manufacturing a capacitance element according to the third embodiment. FIG. 25 and FIG. 26 are perspective views illustrating respective manufacturing processes of the capacitance element, including a cross section of the capacitance element viewed at a position along line B-B' in FIG. 6.

In FIG. 24, as in the first embodiment, the spacer 61 is formed in the opening 19 with the manufacturing processes in step S10 to step S14.

In step S35, tungsten, which is the material of the conductive member 35, is embedded inside the spacer 61 in the opening 19. The conductive member 35 is in contact with and electrically coupled to the capacitance line 8a exposed at the bottom of the opening 19. As illustrated in FIG. 25, the conductive member 35 is formed in a plug-like cross-sectional shape with the depth being longer than the width.

In step S36, the portion of the conductive member 35 that protrudes over the stopper layer 62 is exposed, whereby the protruding portion 35p is formed.

In step S37, as illustrated in FIG. 25, the first capacitance electrode 36a, the capacitance insulation layer 36c, and the second capacitance electrode 36b are formed in this order to cover the protruding portion 35p of the conductive member 35.

In step S38, the capacitance element 36 is completed. As illustrated in FIG. 26, the second capacitance electrode 36b, the capacitance insulation layer 36c, and the first capacitance electrode 36a are patterned by etching to have a width substantially the same as the width of the capacitance line 8a and a planar shape as illustrated in FIG. 6. Then, the capacitance element 36 including the first capacitance electrode 36a, the capacitance insulation layer 36c, and the second capacitance electrode 36b is completed.

Figure 27:
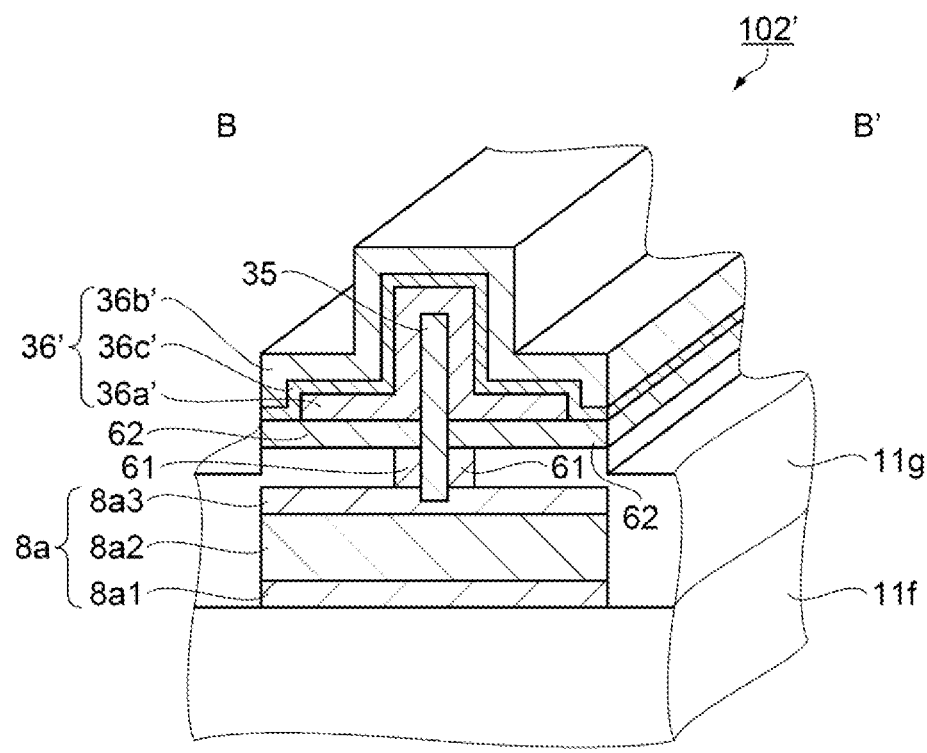
FIG. 27 is a perspective view illustrating a manufacturing process of a capacitance element, including the cross section taken along line B-B' in FIG. 6, according to a subservient example of the third embodiment.

3.3. Subservient Example of Capacitance Element According to Third Embodiment FIG. 27 is a perspective view of a capacitance element according to a subservient example of the capacitance element 36 of the liquid crystal device 102 according to the present embodiment, including a cross section of the capacitance element viewed at a position along line B-B' in FIG. 6. A capacitance element 36' of a liquid crystal device 102' according to the subservient example has a width of a first capacitance electrode 36a' slightly smaller than that of a second capacitance electrode 36b', and cross sections of the first capacitance electrode 36a' are not exposed on cross sections along a longitudinal direction of the capacitance element 36' as a result of patterning by etching in step S38. Thus, short circuiting between the first capacitance electrode 36a' and the second capacitance electrode 36b' can be suppressed.

In the manufacturing of the capacitance element 36', the first capacitance electrode 36a' is first formed in step S37, patterning is performed by etching thereafter, and then the capacitance insulation layer 36c' and the second capacitance electrode 36b' are formed and patterned by etching.

As described above, with the liquid crystal device 102 and the liquid crystal device 102' that are each the electro-optical device of the present embodiment, the following advantages can be achieved.

The liquid crystal device 102 and the liquid crystal device 102' that are each the electro-optical device include: the transistor 30 including the semiconductor layer 30a extending along the first direction, the light shielding region S that is a light shielding layer including the first extending portion S1 extending along the first direction, and the wide portion S3 overlapping the channel region 30c of the semiconductor layer 30a and provided wider than the first extending portion S1, the interlayer insulation layer 11g provided with the opening 19 in a region overlapping the light shielding region S, and the capacitance element 36 including the conductive member 35 provided in the opening 19 of the interlayer insulation layer 11g and including a portion protruding over the interlayer insulation layer 11g, the first capacitance electrode 36a provided to cover the protruding portion 35p of the conductive member protruding over the interlayer insulation layer, and the second capacitance electrode 36b provided to overlap the first capacitance electrode 36a.

In this manner, in the liquid crystal device 102 of the present embodiment, the first capacitance electrode 36a of the capacitance element 36 is provided to cover the protruding portion 35p, of the conductive member 35, protruding over the interlayer insulation layer 11g. Thus, as in the first embodiment, the first capacitance electrode 36a and the second capacitance electrode 36b can be formed at the protruding portion 35p of the conductive member 35 easily and with excellent coverage.

In the capacitance element 36, the electrical coupling between the capacitance line 8a and the first capacitance electrode 36a is not achieved by the first capacitance electrode 36a itself, but is achieved by the conductive member 35, which is a member different from the first capacitance electrode 36a. Thus, the area in which the first capacitance electrode 36a and the second capacitance electrode 36b face each other in the capacitance element 36 can be made larger than the area in which the first capacitance electrode 16a and the second capacitance electrode 16b face each other in the capacitance element 16 according to the first embodiment, whereby the electrostatic capacity of the capacitance element 36 can be made larger than that of the capacitance element 16 according to the first embodiment.

4. Fourth Embodiment

Figure 28:
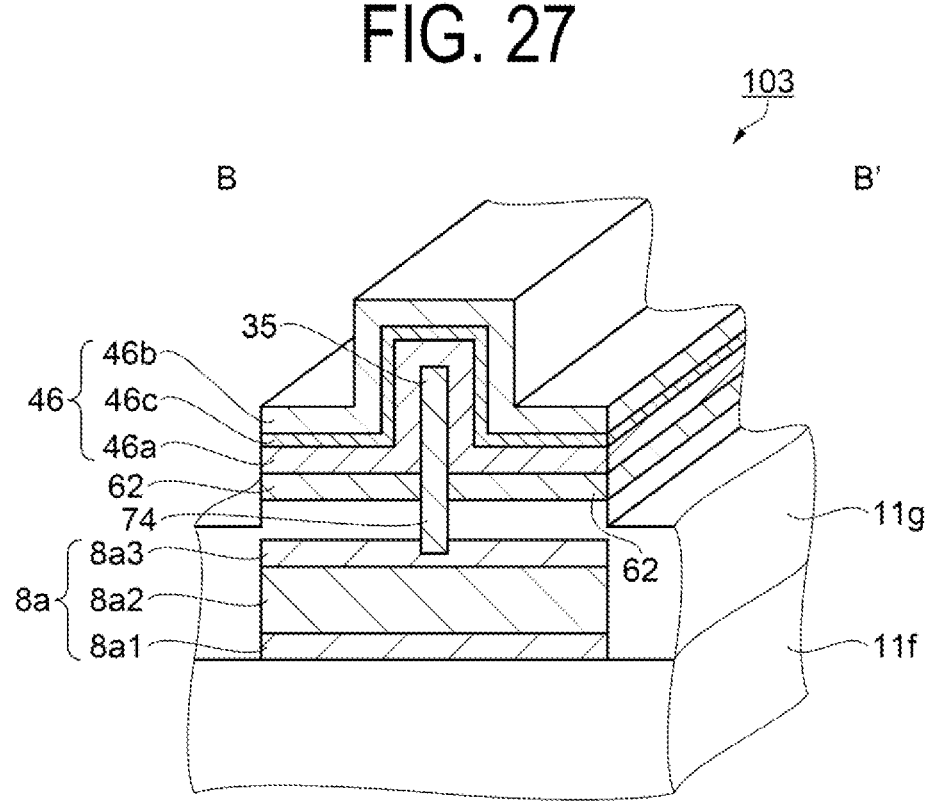
FIG. 28 is a perspective view illustrating a manufacturing process of a capacitance element, including the cross section taken along line B-B' in FIG. 6, according to a fourth embodiment.

FIG. 28 is a perspective view illustrating a manufacturing process for a capacitance element, including a cross section viewed at a position along line B-B' illustrated in FIG. 6.

In the present embodiment, a capacitance element 46 according to still another embodiment different from the capacitance element 16 according to the first embodiment is described. Note that, in the description below, redundant explanations are omitted, with the configurations and the processes that are the same as those in the first embodiment to the third embodiment denoted with the same reference numerals.

4.1. Summary of Capacitance Element

As illustrated in FIG. 28, the capacitance element 46 of a liquid crystal device 103 according to a fourth embodiment differs from the first embodiment in that the electrical coupling between the capacitance line 8a and a first capacitance electrode 46a is not achieved by the first capacitance electrode 46a itself, but is achieved by the conductive member 35 that is a member different from the first capacitance electrode 46a as in the third embodiment. Furthermore, the present embodiment differs from the first embodiment in that the spacer 61 is not provided as in the second embodiment.

The capacitance element 46 includes the first capacitance electrode 46a, a capacitance insulation layer 46c, and a second capacitance electrode 46b. The conductive member 35 is disposed in the opening 74 of the interlayer insulation layer 11g disposed at the capacitance line 8a, and the first capacitance electrode 46a, the capacitance insulation layer 46c, and the second capacitance electrode 46b are disposed to cover a portion of the conductive member 35 protruding over the stopper layer 62. The first capacitance electrode 46a is made of, for example, tungsten. The second capacitance electrode 46b is made of, for example, titanium nitride. The capacitance insulation layer 46c is made of, for example, High-K. Note that the arrangement layout of the opening 74, the first capacitance electrode 46a, and the second capacitance electrode 46b in plan view is the same as that in the configuration of the capacitance element 16 illustrated in FIG. 6.

The conductive member 35 is disposed so as to be in direct contact with the interlayer insulation layer 11g and the stopper layer 62 in the opening 74. In other words, as in the second embodiment, the capacitance element 46 does not include the spacer 61 included in the capacitance element 16.

As in the second embodiment, the capacitance element 46 of the present embodiment does not include the spacer 61 included in the capacitance element 16. Thus, with step S23 to step S25 in the flowchart according to the second embodiment illustrated in FIG. 16, a configuration that does not include the spacer 61 can be manufactured. As in the third embodiment, in the capacitance element 46 of the present embodiment, the electrical coupling between the capacitance line 8a and the first capacitance electrode 46a is achieved by the conductive member 35. Thus, a configuration including the conductive member 35 can be manufactured with step S35 to step S38 in the flowchart according to the third embodiment illustrated in FIG. 24.

Figure 29:
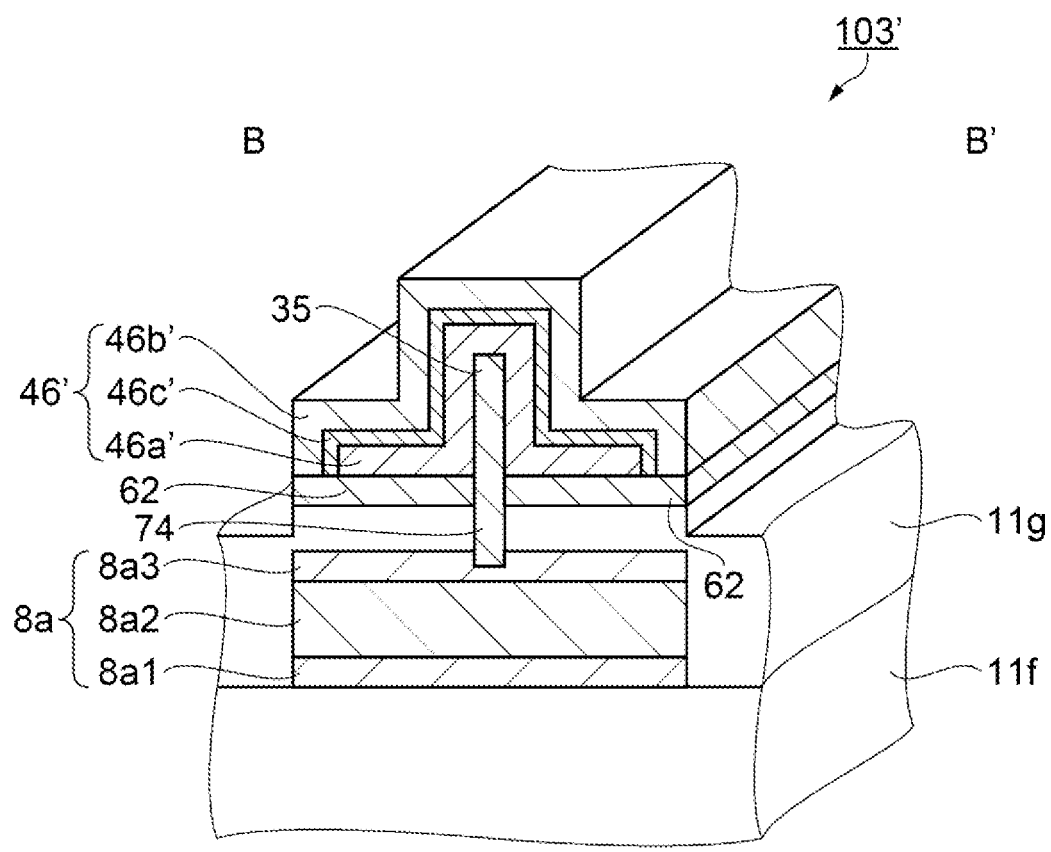
FIG. 29 is a perspective view illustrating a manufacturing process of a capacitance element, including the cross section taken along line B-B' in FIG. 6, according to a subservient example of the fourth embodiment.

4.2. Subservient Example of Capacitance Element According to Fourth Embodiment FIG. 29 is a perspective view including a cross section illustrating a capacitance element according to a subservient example of the capacitance element 46 of the liquid crystal device 103 according to the present embodiment. A capacitance element 46' of a liquid crystal device 103' according to the subservient example has a width of a first capacitance electrode 46a' slightly smaller than that of a second capacitance electrode 46b', and cross sections of the first capacitance electrode 46a' are not exposed on cross sections along a longitudinal direction of the capacitance element 46' as a result of patterning the second capacitance electrode 46b' by etching. Thus, short circuiting between the first capacitance electrode 46a' and the second capacitance electrode 46b' can be suppressed.

5. Fifth Embodiment

5.1 Summary of Electronic Apparatus

Figure 30:
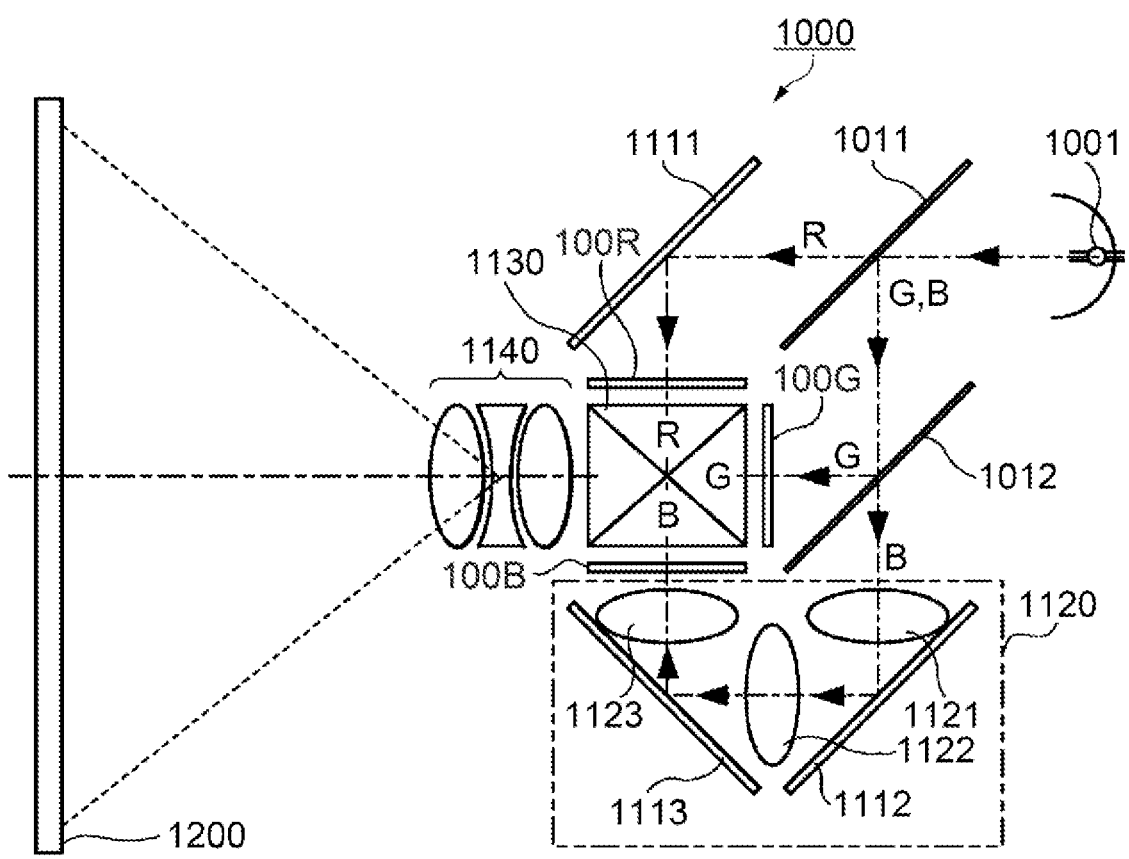
FIG. 30 is a schematic configuration view illustrating a projection-type display apparatus according to a fifth embodiment.

FIG. 30 is a schematic configuration view illustrating a configuration of a projection-type display apparatus as an electronic apparatus according to the present embodiment. In the present embodiment, the projection-type display apparatus 1000 is described as an example of an electronic apparatus including the liquid crystal device 100, 101, 102, 103 as the electro-optical device described above.

As illustrated in FIG. 30, the projection-type display apparatus 1000 that is the electronic apparatus according to the present embodiment includes a lamp unit 1001 serving as a light source, dichroic mirrors 1011 and 1012 serving as a color separation optical system, three liquid crystal devices 100B, 100G, and 100R that are liquid crystal panels, three reflection mirrors 1111, 1112, and 1113, three relay lenses 1121, 1122, and 1123, a dichroic prism 1130 serving as a color combining optical system, and a projection lens 1140 serving as a projection optical system.

The lamp unit 1001 employs, for example, a discharging type light source. The type of light source is not limited to this, and a solid state light source such as a light emitting diode or a laser may be employed.

A light beam emitted from the lamp unit 1001 is separated by the two dichroic mirrors 1011 and 1012 into light beams of three colors in different wavelength regions. The light beams of three colors are a substantially red light beam, a substantially green light beam, and a substantially blue light beam. In the following description, the substantially red light beam is also referred to as a red light beam R, the substantially green light beam is also referred to as a green light beam G, and the substantially blue light beam is also referred to as a blue light beam B.

The dichroic mirror 1011 transmits the red light beam R, and reflects the green light beam G and the blue light beam B with wavelengths shorter than that of the red light beam R. The red light beam R that has transmitted through the dichroic mirror 1011 is reflected by the reflection mirror 1111 to be incident on the liquid crystal device 100R. The green light beam G reflected by the dichroic mirror 1011 is reflected by the dichroic mirror 1012 to be incident on the liquid crystal device 100G. The blue light beam B reflected by the dichroic mirror 1011 transmits through the dichroic mirror 1012 to be emitted to a relay lens system 1120.

The relay lens system 1120 includes the relay lenses 1121, 1122, and 1123 and the reflection mirrors 1112 and 1113. The blue light beam B is likely to have a large light flux because the optical path thereof is longer than those of the green light beam G and the red light beam R. Thus, the relay lens 1122 is used to suppress the expansion of the light flux. The blue light beam B incident on the relay lens system 1120 is reflected by the reflection mirror 1112, and is converged by the relay lens 1121 in the vicinity of the relay lens 1122. The blue light beam B is made incident on the liquid crystal device 100B through the reflection mirror 1113 and the relay lens 1123.

The liquid crystal device 100 that is the electro-optical device according to the first embodiment is applied as the liquid crystal devices 100R, 100G, and 100B serving as light modulation devices in the projection-type display apparatus 1000. The capacitance element 26 according to the second embodiment, the capacitance element 36 according to the third embodiment, or the capacitance element 46 according to the fourth embodiment may be applied as the capacitance element 16 used for the liquid crystal devices 100R, 100G, and 100B.

Each of the liquid crystal devices 100R, 100G, and 100B is electrically coupled to an upper circuit of the projection-type display apparatus 1000. With this configuration, the image signal Dx designating the gradation level of the red light beam R, the green light beam G, and the blue light beam B is supplied from an external circuit, and is processed by the upper circuit. Then, the liquid crystal devices 100R, 100G, and 100B are driven, and the respective color light beams are modulated.

The red light beam R, the green light beam G, and the blue light beam B modulated by the liquid crystal devices 100R, 100G, and 100B are incident on the dichroic prism 1130 from three directions. The dichroic prism 1130 combines the red light beam R, and the green light beam G, and the blue light beam B incident thereon. The red light beam R and the blue light beam B are reflected by the dichroic prism 1130 at an angle of 90 degrees, whereas the green light beam G transmits through the dichroic prism 1130. As a result, the red light beam R, the green light beam G, and the blue light beam B are combined into display light for displaying a color image to be emitted toward the projection lens 1140.

The projection lens 1140 is disposed facing the outer side of the projection-type display apparatus 1000. The display light is expanded and emitted through the projection lens 1140 to be projected onto a screen 1200 that is the projection target.

In the present embodiment, the projection-type display apparatus 1000 is described as an example of the electronic apparatus, but the electronic apparatus to which the liquid crystal device 100 is applied is not limited to this. For example, the liquid crystal device may be applied to electronic apparatuses such as a projection type Head-Up Display (HUD), a direct viewing type Head Mounted Display (HMD), a personal computer, a digital camera, or a liquid crystal television.

With the projection-type display apparatus 1000 of the present embodiment as described above, the following advantages can be achieved in addition to those achieved by the embodiments described above.

The projection-type display apparatus 1000 that is the electronic apparatus preferably includes any of the liquid crystal device 100 including the capacitance element 16, the liquid crystal device 101 including the capacitance element 26, the liquid crystal device 102 including the capacitance element 36, the liquid crystal device 102' including the capacitance element 36', the liquid crystal device 103 including the capacitance element 46, and the liquid crystal device 103' including the capacitance element 46' according to the above-described embodiments.

With this configuration, performance improvement of an electro-optical device through miniaturization and increase in capacity of the capacitance element can be easily achieved, whereby an excellent electronic apparatus can be provided.

In the embodiments described above, a transmissive liquid crystal device is described as an example of the liquid crystal device 100 that is the electro-optical device, but the liquid crystal device 100 may be a reflective liquid crystal device or an LCOS-type liquid crystal device. Note that the LCOS is an abbreviation for Liquid crystal on silicon.

In the embodiments described above, an example is described where the capacitance element is an auxiliary capacitance that is coupled to the pixel electrode 27 of the pixel P and holds the gradation potential, but this should not be construed in a limiting sense. For example, in a pixel circuit performing digital display, the capacitance element may be a capacitance that is coupled to a memory that stores image data or the data line 6a and is used for coupling driving, or a capacitance that is used for the data line drive circuit 22 and forms a capacitive Digital Analog Converter (DAC) that performs digital/analog conversion.

In the embodiments described above, an example is described where the counter electrode 33 is disposed at the counter substrate 20 side, but the position where the counter electrode 33 is disposed is not limited to this. For example, the counter electrode may be disposed between the pixel electrode 27 and the substrate 10a.

In the embodiments described above, an example is described where the inspection circuit 25 is disposed between the seal material 14 and the display region E, but the position where the inspection circuit 25 is disposed is not limited to this. For example, the inspection circuit may be disposed adjacent to the data line drive circuit 22 to be side by side therewith. With this configuration, part of the inspection circuit 25 can be shared with the data line drive circuit 22, whereby the circuit area can be reduced to achieve a configuration suitable for a narrow frame.

In the embodiments described above, a case where two scanning line drive circuits 24 are disposed is described as an example, but the number of the scanning line drive circuit 24 may be one. With this configuration, the location where the scanning line drive circuit 24 is disposed can be reduced, whereby a configuration suitable for a narrow frame can be achieved.

The present disclosure is not limited to the embodiments described above, and may be modified as appropriate insofar that it does not depart from the scope of the claims and the spirit or concepts of the disclosure as inferred from the entire specification, and an electro-optical device and an electronic apparatus including the electro-optical device according to such changes are also included within the technical scope of the present disclosure.

What is claimed is:

1. An electro-optical device comprising:
    a transistor including a semiconductor layer extending along a first direction;
    a light shielding layer including:
        a first extending portion extending along the first direction, and
        a wide portion overlapping a channel region of the semiconductor layer and provided wider than the first extending portion;
    an interlayer insulation layer provided with an opening in a region overlapping the light shielding layer; and
    a capacitance element including:
        a first capacitance electrode provided inside the opening of the interlayer insulation layer and including a protruding portion protruding over the interlayer insulation layer, and
        a second capacitance electrode provided to cover the protruding portion of the first capacitance electrode.

2. The electro-optical device according to claim 1, wherein the light shielding layer is a capacitance line to which a constant potential is applied.

3. The electro-optical device according to claim 1, wherein the opening is disposed in a region overlapping the wide portion.

4. The electro-optical device according to claim 1, wherein
    the light shielding layer includes a second extending portion extending along a second direction intersecting the first direction, and
    the opening is provided in a region overlapping the wide portion, the first extending portion, and the second extending portion.

5. The electro-optical device according to claim 4, comprising a pixel electrode provided corresponding to the transistor, wherein
    the pixel electrode is electrically coupled to the second capacitance electrode through a first contact hole and electrically coupled to the transistor through a second contact hole, and
    the first contact hole and the second contact hole are each disposed in a region overlapping the second extending portion of the light shielding layer.

6. The electro-optical device according to claim 1, comprising a stopper layer disposed between the second capacitance electrode and the interlayer insulation layer, wherein
    the protruding portion of the first capacitance electrode includes a portion protruding over the stopper layer, and
    a length of the portion protruding over the stopper layer is longer than a width of the portion protruding over the stopper layer.

7. The electro-optical device according to claim 6, wherein a spacer is disposed between the stopper layer and the first capacitance electrode at the opening.

8. The electro-optical device according to claim 6, wherein the stopper layer and the first capacitance electrode are in contact with each other at the opening.

9. The electro-optical device according to claim 1, wherein the first capacitance electrode contains tungsten.

10. An electronic apparatus comprising:
    the electro-optical device according to claim 1.

11. An electro-optical device comprising:
    a transistor including a semiconductor layer extending along a first direction;
    a light shielding layer including:
        a first extending portion extending along the first direction, and
        a wide portion overlapping a channel region of the semiconductor layer and provided wider than the first extending portion;
    an interlayer insulation layer provided with an opening in a region overlapping the light shielding layer; and
    a capacitance element including:
        a conductive member provided at the opening of the interlayer insulation layer and including a protruding portion protruding over the interlayer insulation layer, a first capacitance electrode provided to cover the protruding portion of the conductive member, and
a second capacitance electrode provided to overlap the first capacitance electrode.

12. The electro-optical device according to claim 11, wherein the conductive member contains tungsten.

* * * * *